United States Patent
Bregulla et al.

(10) Patent No.: US 12,066,699 B2
(45) Date of Patent: Aug. 20, 2024

(54) OPTICAL ELEMENT AND METHOD FOR PRODUCING SAME

(71) Applicant: siOPTICA GmbH, Jena (DE)

(72) Inventors: Andreas Bregulla, Duderstadt (DE); André Heber, Weimar (DE); Markus Klippstein, Jena (DE)

(73) Assignee: siOPTICA GmbH, Jena (DE)

( * ) Notice: Subject to any disclaimer, the term of this patent is extended or adjusted under 35 U.S.C. 154(b) by 0 days.

(21) Appl. No.: 18/245,494

(22) PCT Filed: Oct. 11, 2021

(86) PCT No.: PCT/EP2021/078013
§ 371 (c)(1),
(2) Date: Mar. 15, 2023

(87) PCT Pub. No.: WO2022/078942
PCT Pub. Date: Apr. 21, 2022

(65) Prior Publication Data
US 2023/0367149 A1     Nov. 16, 2023

(30) Foreign Application Priority Data
Oct. 13, 2020   (DE) ............ 10 2020 006 442.6

(51) Int. Cl.
*G02F 1/13*     (2006.01)
*G02B 26/00*    (2006.01)
(Continued)

(52) U.S. Cl.
CPC ......... *G02F 1/1306* (2013.01); *G02B 26/005* (2013.01); *G02F 1/1341* (2013.01);
(Continued)

(58) Field of Classification Search
CPC .. G02F 1/1306; G02F 1/1341; G02F 1/13439; G02F 1/13471; G02F 1/15; G02F 1/167; G02F 1/133788
See application file for complete search history.

(56) References Cited

U.S. PATENT DOCUMENTS 5,993,940 A   11/1999  Ouderkirk et al.
6,765,550 B2   7/2004  Janick et al.
(Continued)

FOREIGN PATENT DOCUMENTS

CN       1651981 A      8/2005
CN     210534493 U      5/2020
(Continued)

OTHER PUBLICATIONS

Japan Office Action, reference No. B233369.

*Primary Examiner* — Dung T Nguyen
*Assistant Examiner* — David Y Chung
(74) *Attorney, Agent, or Firm* — Christensen, Fonder, Dardi & Herbert PLLC

(57) ABSTRACT

A two-dimensionally extensive optical element having a light entry side and a light exit side. The optical element includes alternating transparent first regions and second regions having materials with different first refractive indices and second refractive indices. The first refractive index is higher than the second refractive index. First layers and second layers which are opaque or are switchable to be opaque are arranged at the light entry surfaces and light exit surfaces of the second regions. When the layers are opaque, the propagation directions of light passing through the optical element are limited compared to layers which are switched to be transparent.

22 Claims, 19 Drawing Sheets

(51) Int. Cl.
  *G02F 1/1337*    (2006.01)
  *G02F 1/1341*    (2006.01)
  *G02F 1/1343*    (2006.01)
  *G02F 1/1347*    (2006.01)
  *G02F 1/15*      (2019.01)
  *G02F 1/167*     (2019.01)

(52) U.S. Cl.
  CPC ...... *G02F 1/13439* (2013.01); *G02F 1/13471* (2013.01); *G02F 1/15* (2013.01); *G02F 1/167* (2013.01); *G02B 2207/115* (2013.01); *G02F 1/133788* (2013.01)

(56) References Cited

U.S. PATENT DOCUMENTS

| | | |
|---|---|---|
| 2002/0180909 A1 | 12/2002 | Lubart et al. |
| 2005/0174529 A1 | 8/2005 | Fukushima et al. |
| 2007/0218261 A1 | 9/2007 | Saitoh et al. |
| 2010/0033827 A1 | 2/2010 | Foley et al. |
| 2012/0234371 A1 | 9/2012 | Zhang et al. |
| 2012/0235891 A1 | 9/2012 | Nishitani et al. |
| 2013/0308185 A1 | 11/2013 | Robinson et al. |
| 2017/0069236 A1 | 3/2017 | Klippstein et al. |
| 2019/0162990 A1 | 5/2019 | Nishimura et al. |
| 2020/0049864 A1 | 2/2020 | Huang et al. |
| 2020/0166767 A1 | 5/2020 | Qin et al. |
| 2021/0191223 A1* | 6/2021 | Liao ..................... G02F 1/1677 |

FOREIGN PATENT DOCUMENTS

| | | |
|---|---|---|
| DE | 10 2015 012 271 A1 | 4/2017 |
| DE | 10 2016 004 842 A1 | 10/2017 |
| DE | 10 2019 006 022 B3 | 7/2020 |
| EP | 1 783 520 A2 | 5/2007 |
| JP | H10-97198 A | 4/1998 |
| JP | 2005221756 A | 8/2005 |
| JP | 2007-155783 A | 6/2007 |
| JP | 5960979 B2 | 7/2016 |
| WO | WO 2012/033583 A1 | 3/2012 |
| WO | WO 2015/121398 A1 | 8/2015 |
| WO | 2020055390 A1 | 3/2020 |
| WO | WO 2020/055390 A1 | 3/2020 |

* cited by examiner

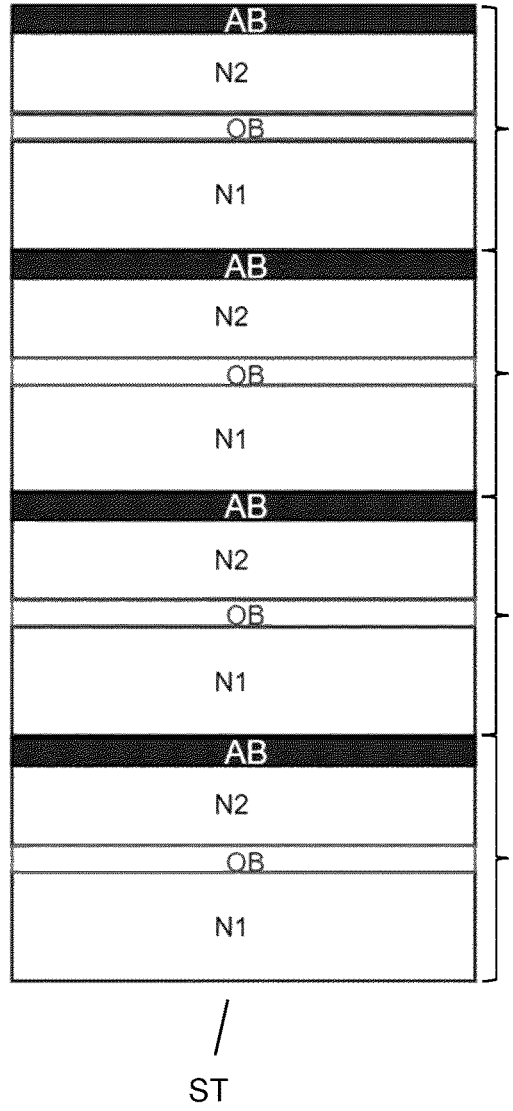
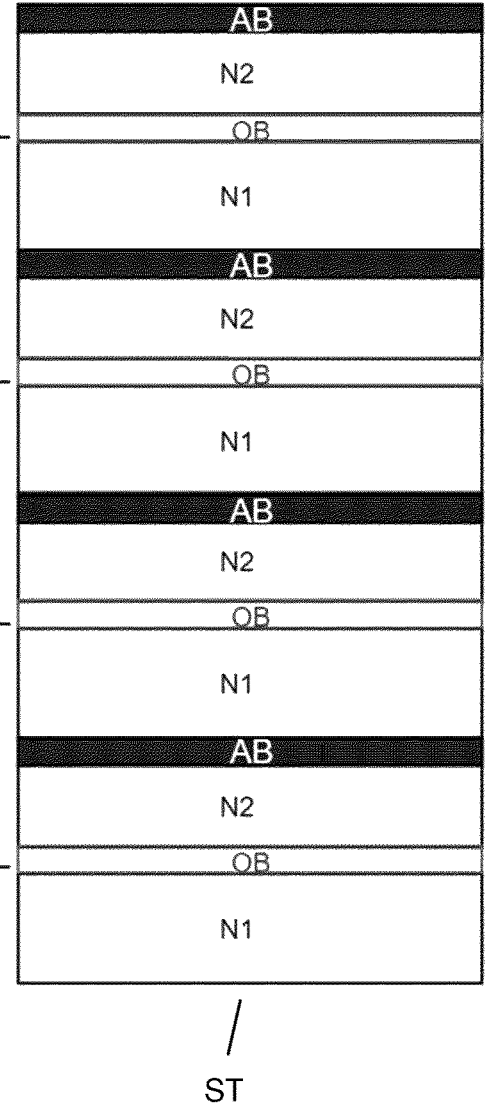
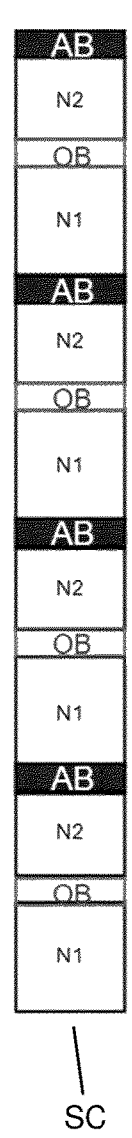
Fig.25b    Fig.25c

OPTICAL ELEMENT AND METHOD FOR PRODUCING SAME

PRIORITY CLAIM

The present application is a National Phase entry of PCT Application No. PCT/EP2021/078013, filed Oct. 11, 2021, which claims priority from German Patent Application No. 10 2020 006 442.6, filed Oct. 13, 2020, the disclosures of which are hereby incorporated by reference herein in their entirety.

FIELD OF THE INVENTION

In recent years, great strides have been made in widening the visual angle in LCDs. However, there are often situations in which this very large viewing area of a display screen can be disadvantageous. Increasingly, information such as bank data or other personal information and sensitive data is also available on mobile devices, such as notebooks and tablets. Accordingly, people need to supervise viewing access to these sensitive data. They must be able to choose between a wide viewing angle for sharing information on their display with others, e.g., when viewing vacation photographs or for advertising purposes. On the other hand, they need a small viewing angle when they want to treat the displayed information confidentially.

A similar problem arises in automotive engineering. In this case, the driver must not be distracted by image contents, e.g., digital entertainment programs, when the engine is running, but the passenger would like to consume such images also during driving. Consequently, there is a need for a display screen which can switch between the corresponding display modes.

BACKGROUND OF THE INVENTION

Add-on films based on microlouvers have already been used for mobile displays in order to achieve protection of visual data. However, these films were not switchable; they always had to be manually applied first and then removed again subsequently. They also had to be carried separately from the display when not in use at a particular time. A further substantial drawback in the use of such louvered films is connected to the light losses entailed.

U.S. Pat. No. 6,765,550 B2 describes such a protected view by means of microlouvers. The greatest disadvantage in this respect is the mechanical distance or mechanical mounting of the filter and the light losses in protected mode.

U.S. Pat. No. 5,993,940 A describes the use of a film which has small prism strips arranged uniformly over its surface in order to achieve a private mode. The development and production are fairly cumbersome.

In WO 2012/033583 A1, switching between public view and restricted view is produced by means of controlling liquid crystals between so-called chromonic layers. There is light loss and expenditure is quite high.

US 2012/0235891 A1 describes a very elaborate backlight in a display screen. According to FIGS. 1 and 15, not only is a plurality of light guides utilized but also further, complex optical elements such as microlens elements 40 and prism structures 50 which transform the light of the illumination unit from the rear to the front. This is expensive and complicated to implement and also involves light losses. According to the variant shown in FIG. 17 in US 2012/0235891 A1, both light sources 4R and 18 produce light with a narrow illumination angle, the light from the rear light source 18 first being transformed laboriously into light with a large illumination angle. This complex transformation sharply reduces brightness as has already been noted above.

According to JP 2007-155783 A, special optical surfaces 19 which are difficult to calculate and produce are used to deflect light in different narrow or broad areas depending on the incident angle of light. These structures resemble Fresnel lenses. Further, there are interfering edges which deflect light in unwanted directions. Accordingly, it remains unclear whether or not meaningful light distributions can actually be achieved.

US 2013/0308185 A1 describes a special, stepped light guide which emits light on a large area in various directions depending on the direction from which it is illuminated proceeding from a narrow side. Accordingly, in cooperation with a transmissive image display device, e.g., an LC display, a display screen can accordingly be produced which is switchable between a public viewing mode and a restricted viewing mode. One of the drawbacks consists in that the restricted viewing effect can only be produced for left/right or up/down, but not for left/right and up/down simultaneously as is necessary for certain payment processes, for example. In addition to this, a residual light is also always still visible in the restricted viewing mode from blocked viewing angles.

WO 2015/121398 A1 by the present applicant describes a display screen with two modes of operation in which essentially scattering particles are present in the volume of the corresponding light guide for toggling between operating modes. However, the scattering particles selected therein which comprise a polymerizate generally have the disadvantage that light is coupled out of both large areas so that about one half of the useful light is emitted in the wrong direction, namely, toward the backlight, and cannot be recycled there to a sufficient extent because of the construction. Beyond this, the scattering particles of polymerizate which are distributed in the volume of the light guide can lead to scattering effects under certain circumstances, particularly at higher concentrations, and these scattering effects reduce the viewing privacy effect in the protective operating mode.

The methods and arrangements cited above generally share the disadvantage that they appreciably reduce the brightness of the basic display screen and/or require a complicated and expensive optical element for mode switching and/or offer only a limited private view and/or lower the resolution in the public mode and/or permit only narrow viewing areas, and the brightness decreases so rapidly over the angular spectrum that the image seen by an observer is very inhomogeneous with respect to brightness.

SUMMARY OF THE INVENTION

Therefore, it is the object of the invention to develop a two-dimensionally extensive optical element which can influence the propagation directions of incident light in a defined manner and which can switch optionally between at least two operating states—a public viewing mode and a private viewing mode. In the private viewing mode, the light exits from the optical element only in a limited angular range, i.e., with fewer propagation directions, compared to the public viewing mode. The optical element shall be realizable inexpensively and, in particular, shall be universally usable with diverse types of display screen in order to enable switching between a private viewing mode and a public viewing mode, and the resolution of such a display screen shall be reduced only negligibly, if at all. Further, the optical element shall basically afford the opportunity to achieve a top hat light distribution. By this is meant that the brightness decreases by no more than 15% in an angular range of at least 7° around the central emission angle.

This object is met by a two-dimensionally extensive optical element having a light entry side and a light exit side which comprises at least first regions comprising a first transparent material with a first refractive index and second regions comprising a second transparent material with a second refractive index which alternate over the surface of the first optical element in a one-dimensional or two-dimensional periodic sequence, the first refractive index being higher than the second refractive index within the entire wavelength range visible to the human eye. It further comprises in each instance a first layer at a light entry surface of each of the second regions, which first layer is permanently opaque or is switchable between a transparent state and an opaque state, and in each instance a second layer at a light exit surface of each of the second regions, which second layer is permanently opaque or is switchable between a transparent state and an opaque state.

Owing to the first layers, light impinging on the optical element on the light entry side is incident in the optical element exclusively through the light entry surfaces of the first regions when the first layers are in an opaque state and, depending on the incident angle, polarization and the ratio of the first refractive index to the second refractive index, a) is propagated unimpeded or is totally internally reflected inside of a first region and is thereafter coupled out again at a light exit surface of the corresponding first region, or b) penetrates from the first region into an adjoining second region, propagates in the latter and is ultimately absorbed at the light exit side thereof when the second layer is in the opaque state or is coupled out when the second layer is in the transparent state, or c), in case the light has penetrated from the first region into the adjoining region, penetrates in turn into a further, adjacent, first region and, depending on the propagation direction and polarization which then exist, is coupled out at the light exit surface or propagated further in the optical element until it is either coupled out or absorbed. In case a), unimpeded propagation means that the light rays do not impinge on a region boundary but rather travel straight through the first region without being totally internally reflected.

As a result, the propagation directions of the light exiting from the optical element at the light exit side are limited compared to the light impinging on the optical element at the light entry side insofar as at least one of the two layers—the first layer and/or the second layer, but preferably the second layer—is opaque.

The incident angle of a light ray in the first regions refers in particular to its direction vector describing the horizontal and vertical incident angles on the light entry surface—also referred to as "bottom surface"—of a first region and, apart from the polarization state, is of the utmost importance for the further propagation of the light in the first region B1 or at the interfaces with second regions.

In principle, all light rays not falling under case a) or b) fall under case c).

The "periodic sequence" of the first regions and second regions does not mean that these regions must always be equally wide and/or high, but rather that the first regions and second regions merely always alternate. However, their size can vary.

The third case c) only occurs in case the light has penetrated from the first region into the adjoining second region and, from there, penetrates again into a further adjacent first region, i.e., for the rays which, after overcoming the refractive index boundary from the first region into the second region, again overcome the next refractive index boundary from the relevant second region to the adjacent first region on the other side and, depending on the propagation direction and polarization which then exist, are coupled out at the light exit surface or propagate further in the optical element until they are either coupled out or absorbed. This case is relevant for special instances of application, such as when light propagation directions are to be absorbed, for example, in medium angles of approximately 30° to 50° but light impinges on larger and smaller angular ranges than this. The cases mentioned under c) can be included or excluded based on optical simulation of the optical element through suitable dimensioning of the first refractive index and second refractive index and suitable choice of the widths and heights of the first regions and second regions. This will be explained in more detail in the following.

For achieving the preferable limiting of the propagation directions of the incident light in accordance with the invention (i.e., only rays falling under case a)), it is important that the first layers and second layers are actually opaque. Once one of the layers is not opaque, oblique light rays above the actual critical angle of total internal reflection at the interface between a first region and a second region either exit at the upper edge of the second regions or they can exit via the upper edges, for example, i.e., the light exit surfaces, of the first regions B1 subsequently, possibly when entering the second regions.

Advantageous embodiments are configured such that every first layer is formed at the light entry surfaces of the second regions by a permanent absorber layer and/or by at least one layer reflecting away from the optical element. When only one reflective layer is provided, which is possible within the scope of the invention, it goes without saying that this layer will also have opaque characteristics. The reflective characteristics contribute to increasing the efficiency, for example, when an optical element according to the invention is installed in an illumination device, such as for an LCD panel.

Further, it is possible that every second layer is formed at the light exit surface of the second regions by a permanent absorber layer. If the first layer and second layer then have permanent opaque characteristics in certain static embodiments and if the first refractive index and second refractive index are unchangeable, the optical element permanently acts to limit the propagation directions of the light incident on it.

In a particular embodiment of the optical element according to the invention, the first refractive index (N1) of the material in the first regions (B1) and/or the second refractive index (N2) of the material in the second regions (B2) are/is switchable between at least two states such that the ratio of the two refractive indices (N1, N2) at the boundaries between the first regions (B1) and the second regions (B2) can be modulated in each instance, as a result of which the above-mentioned limiting of the propagation directions is variable.

To this end, at least one of the materials of the first and/or second regions can comprise liquid crystals which are in contact with electrodes in order to bring about a change in the refractive index for linearly polarized light in the liquid crystals via a change in the voltage at the electrodes. When arranged, for example, at the light exit surface and light entry surface—the top and bottom—of the first regions, the electrodes can be transparent, e.g., in the form of indium tin oxide (ITO) layers. However, if the electrodes are necessary for changing the second refractive index of the second regions, it can also happen—particularly in case of first layers and second layers formed as permanent absorber layers—that non-transparent or even opaque electrodes are used.

For this embodiment with liquid crystals, it is preferred that the first layer and second layer are permanently opaque so that, further, as a rule, exclusively the light rays falling under case a) can exit the optical element upward. However, these rays falling under case a) have a narrower or wider angular range of propagation directions depending on the difference in refractive index at the interfaces from the first region to the second region. The greater the difference in the refractive index, the wider this angular range, and the smaller the difference in refractive index, the smaller the angular range.

Conversely, in other embodiments of the invention which are switchable in a different manner, if the first layer and/or the second layer is switchable between an opaque state and a transparent state, the characteristic of the limitation of the propagation directions of the light incident on the optical element can be switched on and off. The light propagation directions are limited (case a)) exclusively in the case that both layers are opaque. Once one of the two layers is not opaque, the limiting of the light propagation directions ceases (cases a), b) and possibly c)). Accordingly, the optical element is switchable. In case even both layers should be switched to transparent, the optical element merely causes— depending on the incident direction of the light—ray displacements and total internal reflections but does not block any light.

In preferred switchable embodiments, only the top, second, layer is configured to be switchable between opaque and transparent, while the bottom, first, layer is configured to be permanently opaque (and possibly also reflective). This is sufficient to achieve the desired effects.

The switchability of the two layers can preferably be based on one or more of the following principles simultaneously: electrowetting, electrophoresis, electrochromism and/or liquid crystal cells. It will be understood that other embodiments are also possible.

In case of electrowetting, at least two states of the liquid or liquid mixture subjected to electrowetting are defined for at least one of the two layers. In a first operating state, the relevant layer would cover the corresponding surface of a second region as completely as possible, i.e., would be opaque (in which case (a) there is a limiting of the propagation directions). In a second operating state, the relevant layer would cover the corresponding surface of a second region only on the smallest possible surface, i.e., would be substantially transparent (in which case—a), b) and possibly c)—there would only be negligible limiting of the propagation directions, if any).

In the case of electrophoresis, opaque particles with electrophoretic mobility would be provided in a liquid or gel matrix for at least one of the two layers. Due to the effect of an electric field which can be applied via transparent electrodes, they would then cover the corresponding surface of a second region as completely as possible in a first operating state as relevant layer such that the relevant layer acts opaquely (there is limiting of the propagation directions). In a second operating state with a different electric field distribution, the particles, as relevant layer, would cover the corresponding surface of a second region over the smallest possible surface or would be moved into a reservoir or distributed in the volume, i.e., the layer would consequently be transparent (there is no limiting of the propagation directions).

In principle, this embodiment using electrophoresis can also be configured in such a way that, for at least one of the two layers, particularly for the second layer, due to the particle positions directly on the second regions or at a distance therefrom (at most, 100 µm are sufficient), a total internal reflection structure at the surface of the second regions is either frustrated—with corresponding absorption of the light by the particles—or not frustrated—with corresponding distance of the particles—so that total internal reflection occurs, and the corresponding rays are at least partially coupled out of the light exit surfaces of the first regions after further propagation in the optical element. In this connection, generally, all of the optical switching technologies based on such a variant or similar variants of "frustrated total internal reflection" can be applied.

Beyond this, Janus particles which can be rotated in a stationary manner due to the electric field effects and whose surface is approximately one half opaque and one half scattering, white and/or reflective are also contemplated as particles. These Janus particles can also form each of the two layers in order to switch these layers between an opaque state and a reflective state. In this latter state, because of the reflection, the corresponding rays are at least partially coupled out of the light exit surfaces of the first regions in the latter state after further propagation in the optical element.

In the case of electrochromism, the two layers would be formed with electrochromic materials, e.g., some metal oxides ($TiO_2$, $NiO$, $Nb_2O$, $MoO_3$, $Ta_2O_5$, $WO_3$, $IrO_2$, $Zr_2O_5$), and corresponding transparent electrodes, e.g., ITO (indium tin oxide, indium-doped zinc oxide), FTO (fluorine tin oxide, fluorine-doped tin oxide) or AZO (aluminum-doped zinc oxide) in which the electrochromic materials are embedded. Depending on the voltage applied to the electrodes, at least two states are defined for the two layers. The relevant layer is opaque (there is limiting of the propagation directions) in a first operating state and transparent (no limiting of the propagation directions) in a second operating state.

The two layers can also be formed as liquid crystal cells such as TN cells with corresponding polarizer pairs. They can then be switched to opaque (there is limiting of the propagation directions) or transparent (there is no limiting of the propagation directions) correspondingly by applying corresponding electric fields or voltages to electrodes. One polarizer of the above-mentioned polarizer pair can then also physically correspond to a polarizer of an LCD panel when the optical element according to the invention is used in connection with such an LCD panel.

In general, the smaller the difference between the first refractive index and the second refractive index, the narrower the light distribution of the light exiting the optical element. It should be noted once again for a clear understanding of the physical relationships that "refractive index" means either the first refractive index or second refractive index for a selected wavelength, e.g., 580 nm, or the respective dispersion curve over the entire wavelength range visible to the human eye. In the case of the dispersion curve, the difference in the refractive index designates the respective value that corresponds to the difference between the two refractive indices at a selected visible wavelength $\lambda$.

It should be mentioned in this connection that the optical element can be formed in particular embodiments as a very exact, wavelength-selective color filter. When the dispersion curves of the two refractive indices intersect depending on the wavelength, the corresponding wavelength range would be efficiently canceled, i.e., not coupled out of the optical element, in opaque layers at wavelengths where the second refractive index is greater than the first refractive index, while the wavelength ranges for which the first refractive index is greater than the second refractive index would be coupled out of the optical element. Depending on the shape of the dispersion curves, such an optical element with a wavelength-selective effect would have to be operated with an obliquely directed light because, in every case, the critical angle of total internal reflection at the interfaces between first regions and second regions must be used in order to separate the spectra. In an exemplary further development, two spectra, for example, one spectrum in a narrow UV range and one spectrum in a white, spectrally wide range, would then be separated with such a wavelength-selective color filter. If the separating effect due to the switched off opacity of the at least one of the two layers is eliminated, the two spectra could be transmitted through the color filter. The UV light could then be converted into visible, white light resulting in the possibility to switch between different angular spectra overall for white light.

In an advantageous embodiment of the optical element, the first regions and second regions are arranged to be distributed in alternating stripes over the surface of the optical element when viewed in parallel projection perpendicular to the optical element. Accordingly, the limiting of the light propagation directions would be operative perpendicular to the stripe-shaped areas but not parallel to them.

In contrast, another embodiment provides that the first regions are arranged so as to be distributed over the surface of the optical element in a point-shaped, circular, oval-shaped, rectangular, hexagonal or otherwise two-dimensionally shaped manner when viewed in parallel projection perpendicular to the optical element, and the second regions are shaped in a complementary manner. In this way, the limiting of the light propagation directions would be effective in at least two planes extending perpendicular to the surface of the optical element. In practice, the effect of such an optical element is generally such that the light propagation directions for transmitted light are focused in every angle close to the perpendicular bisectors of the optical element or parallel thereto. By "close to" is meant in this instance that the divergences from the perpendicular bisectors or parallels thereto are less than 25° or 30° depending upon the embodiment.

Other shapes of the first regions and second regions are also possible. It is always important for maintaining the functioning of the invention that the first regions and second regions directly adjoin one another optically so that the change in the refractive index happens without an air gap as far as possible.

Further embodiments provide that the first regions and second regions are formed in the shape of a trapezoid when viewed in sectional direction perpendicular to the upper surface of the optical element. By shaping the first regions and second regions in this way, the propagation directions of the light exiting from the optical element are selectively influenced: depending on the embodiment, a sharper or weaker focusing of the light over the surface takes place. Further, it is possible, for example, by means of parallelogram-shaped cut shapes, to achieve a peak shift through the accompanying tilting of the interfaces between the first regions and second regions. The trapezoid shape has the advantage that the angular distribution will be focused even better in this way and the private viewing mode will be further improved.

Further, it can be advantageous when the at least occasionally opaque first layers and/or second layers are embedded in the material from which the first regions are composed. The material of the first regions of the optical element preferably transitions seamlessly into the above-mentioned material in which the corresponding layers are embedded.

Beyond this, it is possible to apply a lens structure, preferably a convex lens structure, on at least some of the first regions, preferably on all of the first regions, on the light exit side thereof, i.e., the top as seen by an observer. This assists in the defined influencing of the propagation direction of the light exiting from the optical element. Alternatively or additionally, the light entry side, i.e., the bottom as viewed by an observer, of the first regions can have a concave or convex lens structure in order to influence the light input directions into the first regions and, accordingly, also to influence whether or not a light ray ultimately falls within the aforementioned cases a), b) or c).

In principle, within the framework of the invention, the second, top, layers and the first, bottom, layers can be exchanged, i.e., the first optical element functions regardless of which of the large-area surfaces of the optical element is on top or on bottom, particularly when both layers are permanently opaque.

Further, it can be helpful to arrange a polarizer, optionally a reflective polarizer, below and/or above the optical element to optimize the effect. Controlling the polarization by means of a polarizer allows the refractive index transitions to be utilized more efficiently. Further, the p-polarization of the incident or emergent light can be utilized to minimize the Fresnel reflections, i.e., to optimize the limiting of the light propagation directions.

In particular cases of application, it is possible that there is formed on the optical element at least one first region, the shortest dimension of which when viewed in parallel projection perpendicular to the optical element is at least twenty times larger than the shortest dimension of all of the second regions when viewed in parallel projection perpendicular to the optical element, so that there is no limiting of the propagation directions of the light exiting from the optical element relative to the light impinging on the optical element inside of the above-mentioned at least one first region, excluding at the edges thereof and with the exception of parallel shifts. This means nothing other than that the limiting of the propagation directions does not act on the entire surface area of the optical element. Such non-limiting first regions can also be repeated multiple times on the optical element without contacting one another.

Further, it can be useful to form further regions in addition to the first regions and second regions, which further regions have parameters with respect to shape and/or refractive index that are different than those of the first regions and second regions such that light which penetrates these further regions and exits from the optical element undergoes limiting of the propagation directions that is different than that in the first regions. Accordingly, regions with different limiting of the light propagation directions can be realized so as to be distributed over the optical element with—in a manner of speaking—different focusing.

Further, it is contemplated to apply additional reflective layers and/or additional absorbent layers to the optical element in order to further strengthen or modulate the effect of limiting the light propagation directions. Further, protective coatings or substrates can be additionally applied to the light entry side and/or light exit side, i.e., on the top and/or bottom of the optical element. In this respect, however, the ray displacements and influences on the light direction during the out-coupling of the light, particularly out of the first regions, should be looked at in terms of optical dimensioning.

The invention acquires particular significance in the use of an optical element as described above having a display unit (e.g., an LCD panel, an OLED or micro-LED or any other display technology) or having an illumination device for a transmissive display unit (e.g., LCD panel). In the latter case, the optical element, particularly in switchable embodiments, would be integrated directly in an illumination device for a transmissive display unit such as an LCD panel. This illumination device can then permanently act as a directed backlight (when the first and second layers are permanently opaque) and can be used, for example, in configurations according to the applicant's WO 2015/121398 or WO 2019/002496. Alternatively, such an illumination device comprising at least one area emitter and an optical element according to the invention can also function directly as switchable illumination device for an LCD panel when at least one of the two layers is switchable between a transparent mode and an opaque mode.

A switchable private view is achieved for the display unit in the uses formulated above. In the first operating state, in which there remain only the above-mentioned cases a) for the rays exiting from the optical element, a private view effect is provided which, depending on the embodiment, has a top hat distribution. In the second operating state in which, in general, cases a) and b) and—only in exceptional cases— also c) are applicable for the rays exiting from the optical element, a public viewing mode is provided in which the display unit can be viewed freely from all directions.

In case an optical element according to the invention is arranged in front of a display unit in viewing direction in order to selectively or permanently limit the light propagation directions thereof, optics which substantially concentrate the light emitted by the respective pixels of the display device on the surfaces opposite the first regions can optionally be provided on the display unit. This is possible, for example, with the microlens arrays or lenticular elements which approximately have the periods of the pixel widths (or possibly pixel heights). In the best case, the periods of the first regions should then correspond to the periods of the pixel widths and pixel heights, respectively.

A display screen of this type which comprises at least one optical element of the type described above, also referred to as first optical element, and a display unit can be used, for example, in a passenger car or a mobile device. Further, it is also possible, if necessary, to retrofit a display unit with a first optical element, be it switchable or not, by arranging this first optical element in front of the display unit.

The invention also comprises a method for producing such a first optical element which comprises the steps described in the following. First, a mold is produced, having a positive structure of desired first regions and the negative structure of a carrier substrate (i.e., the second regions are filled with mold material, while the first regions are not filled with mold material; a cavity can be provided in the mold for a carrier substrate which is filled in particular with a polymer for the first regions in a subsequent step). The mold is then filled with a first polymer which is initially liquid and has a first refractive index after setting. The first polymer is then cured by UV light or by cooling, and the workpiece is subsequently removed from the mold. Structures of second regions in the workpiece are subsequently filled with a second polymer which has a second refractive index after hardening. The second polymer is also cured by UV light or by cooling.

After the first polymer or second polymer is cured, a material which is opaque or is switchable between transparent and opaque is optionally vapor-deposited or sputtered onto the second regions on the surfaces, i.e., on the top and bottom surface of the workpiece seen from direction of an observer, through a mask protecting the first regions in order to obtain the first layer or second layer, or the second regions are printed with an opaque material.

The invention further comprises another method for producing a (first) optical element including the steps described in the following. First, a plurality of base blocks are generated which contain layers connected to one another in the following sequence: a second layer acting as absorber layer, a second transparent layer comprising a material with a second refractive index, an opaque first layer, and a first transparent layer comprising a material with a first refractive index. A plurality of base blocks are than stacked one above the other and connected in order to obtain a first stack block. Disks with a second layer thickness are then cut from the stack block. These disks with first transparent layers having the first refractive index and with a first layer thickness which are interposed between the disks are stacked and connected in order to obtain a second stack block. Optical elements are then cut from the second stack block. The first layer can preferably be formed to be reflective. The base blocks can be connected to one another and/or the disks can be connected to the first transparent layers, for example, by vulcanization. The disks are preferably cut from the first staple block and/or optical elements are preferably cut from the second stack block perpendicular to a surface extension plane of the individual layers.

In particular embodiments of the optical element, the second transparent layer with the second refractive index can also be selected to be absorbent. The second layer acting as absorber layer can then be omitted.

Further alternative contemplated production methods would be, for example, the use of two polymers in order to configure the first regions B1 and second regions B2 with different refractive indices, respectively, in a three-dimensional printing process, the etching of glass, wherein the etched regions (either the first regions or the second regions) are preferably subsequently filled with a polymer, different crosslinking of polymers, and the use of photoaligned molecules. In all of these cases, the first and second layers are then applied in the manner described above. Needless to say, other production methods for an optical element are also possible.

The above-stated object of the invention is also met by a method for limiting the light propagation directions of two-dimensionally propagating light in the wavelength range visible to the human eye comprising the steps described in the following. In a first step, the light is modulated two-dimensionally by means of a planar aperture which contains at least transparent first regions and opaque second regions alternating in a one-dimensional or two-dimensional periodic sequence over the surface of the aperture. Within the entire wavelength range, light propagating through the transparent first regions is split based on refractive index and depending on angle into rays which are reflected inside of—i.e., at an angle smaller than the critical angle of total internal reflection—the critical angle of total internal reflection at a refractive index boundary and, finally—i.e., after undergoing total internal reflection or unimpeded propagation one or more times—are coupled out, and into rays which penetrate the aforementioned refractive index boundary outside of the critical angle of total internal reflection—i.e., at an angle that is larger than the critical angle of total internal reflection for this combination of materials—continue to propagate and are thereafter absorbed by an absorber so that the out-coupled light has limited light propagation directions compared to the originally two-dimensionally propagating light.

The statements made above concerning the (first) optical element according to the invention in its various embodiments are to be applied analogously in this instance, and the first regions and second regions can correspond to one another in this case within the transposed meaning. A detailed explanation will be omitted in order to avoid repetition.

The invention further comprises an optical element which is formed of a one-dimensional or two-dimensional periodic sequence of two transparent complementary shapes with different refractive indices, respectively. The shapes are optionally formed on a planar substrate and accordingly form a plane in two directions in each instance. The one refractive index can advantageously be equal to one, i.e., the material in the one shape is air, for example. Accordingly, light which impinges on such an optical element in a preferential direction is transmitted unimpeded, while light which has an angle of more than 15° relative to the above-mentioned preferential direction is deflected through the optical element because of total internal reflection and/or Fresnel reflections. The propagation directions of the emergent light are also influenced in this case. The preceding embodiments can be applied in an analogous manner and will therefore not be discussed again here.

Lastly, the invention comprises a further two-dimensionally extensive optical element having a light entry side and a light exit side. This further optical element comprises at least first regions comprising a transparent material with a first refractive index and second regions comprising an opaque material with a second refractive index which alternate over the surface of the optical element in a one-dimensional or two-dimensional periodic sequence, the first refractive index being higher than the second refractive index within the entire wavelength range visible to the human eye. Because of the opaque material of the second regions, light impinging on the optical element is incident into the optical element at a first large-area surface thereof exclusively through light entry surfaces of the first regions. Depending on the geometric direction of incidence, polarization and the ratio of the first refractive index to the second refractive index, the light either a) propagates unimpeded or is totally internally reflected inside of a first region and is thereafter coupled out again at a light exit surface of the corresponding first region, or b) penetrates from the first region into an adjoining second region, where it is absorbed because of the opaque material of the second regions. Because of the different first refractive indices and second refractive indices, rays penetrating into second regions are refracted more strongly away from the perpendicular. Because of this, the absorption of such light is improved compared to materials with the same refractive indices. Accordingly, such rays are more thoroughly canceled than would be the case without a difference between refractive indices. On the whole, the light exiting from the optical element at a second large-area surface of the optical element is limited with respect to its propagation directions compared to the light impinging on the optical element at the first large-area surface of the optical element.

This embodiment is an improvement over the prior art particularly in that, first, a top hat distribution can also be achieved with optical elements which are similar to the louver filters, since, as a result of the total internal reflection, more useful light is transmitted in the desired limited angular ranges than without total internal reflection, as is common in the prior art, and in that, second, the limiting of the angular ranges of the light penetrating the third optical element is appreciably stronger because it is not solely the opaque louvers which ensure the light direction; rather, it is also the difference in refractive indices between the two regions which ensures that rays which penetrate into second regions are refracted more strongly away from the perpendicular and, therefore, would have to travel a longer optical path through the absorbent material, i.e., are accordingly more thoroughly canceled than would be the case without such a difference in refractive indices.

The opaque material with the second refractive index is designated as such because it is effectively opaque. Specifically, it is actually a transparent material which has the second refractive index but which is mixed with an absorbent material, particularly absorbent particles, as a result of which an opaque effect is brought about overall. In other words, the opaque material is a material with transparent components and opaque components. For example, the opaque material can comprise a paint or polymer as transparent component and, for the opaque component, can be mixed, for example, with graphite particles having a size of less than 500 nm in direction of largest dimension, or nanoparticles of carbon black having a size of less than 200 nm. Alternatively or in combination, the opaque component of the opaque material can also contain dyes or mixtures of dyes. A suitable dye is, for example, Sudan black which absorbs all light in the visible range. The mass percentage of absorbent particles in the opaque material should generally be no more than 50%. However, exceptions are possible.

In a preferred embodiment, third regions comprising a further opaque material with a third refractive index are formed between every two second regions, and the third refractive index is higher than the first refractive index and higher than the second refractive index. The difference in refractive indices between the first refractive index and second refractive index in this particular case should preferably be no larger than 0.1%; on the other hand, a large difference between the first refractive index and third refractive index is desirable for efficiency. Further, second regions can also be formed between the light entry side of the optical element and the third regions on the one hand and between the light exit side of the optical element and the light exit surfaces of the first regions on the other hand. In this way, the focusing of the angular range in which light is emitted can be further sharpened and the private viewing mode can accordingly be improved.

The construction of the further opaque material with the third refractive index is similar to that of the opaque material with the second refractive index, i.e., it comprises a transparent component and an opaque component with a mass percentage of the absorbent particles amounting to 50% at most. In this embodiment with three different materials, the mass percentage of the absorbent particles in the opaque material with the second refractive index can also come out to be appreciably less than 50% provided it is sufficiently high in the further opaque material with the third refractive index.

This optical element which has just been described can advantageously comprise a reflective coating on one of the large-area surfaces, preferably on the bottom large-area surface. This can be either an angle-dependent reflective coating of the entire large-area surface or a fully reflective coating on the surfaces of the second regions. The statements made about the optical element described initially regarding particular embodiments can also be applied to this optical element and therefore will not be repeated.

In this regard, the invention further comprises a method for producing the optical element lastly described which comprises the steps described in the following. First layers with a first refractive index comprising a transparent material and second layers with a second refractive index comprising an opaque material are stacked in an alternating manner, the first refractive index being higher than the second refractive index. These first and second layers are then connected to one another, for example, by vulcanizing or cementing. Finally, optical elements are cut from the layer composite.

It generally applies for all of the optical elements that the roughness Ra at the interfaces between regions with different refractive indices should preferably be less than or equal to 20 nm.

The various embodiments of the invention described above can also be realized directly on a self-emissive display unit. In this respect, OLED panels which will be described in more detail in the following are particularly suitable. However, other self-emissive display types are also contemplated.

The implementation can be carried out in the following manner, for example. The first regions comprising a material with the first refractive index are applied directly to the luminous region of an OLED pixel. The second regions with structures which complement the first regions which are covered with an at least temporarily—i.e., permanently or switchably—opaque first and/or second layer are applied to the non-luminous regions of the OLED panel. The first regions are not covered with scattering structures in order to increase the light efficiency of the OLED pixels, but preferably the upper side of the at least temporarily opaque first layer and second layers.

The performance of the invention remains consistent in principle when the above-described parameters are varied within certain limits.

It will be understood that the features mentioned above and those yet to be explained below may be used not only in the stated combinations but also in other combinations or alone without departing from the scope of the present invention.

BRIEF DESCRIPTION OF THE DRAWINGS

The invention will be explained in more detail in the following with reference to drawings which also disclose key features of the invention. These embodiment examples are provided merely to be illustrative and should not be considered as restrictive. For example, a description of an embodiment example having a plurality of elements or components should not be interpreted to mean that all of these elements or components are necessary for its implementation. On the contrary, other embodiment examples may also contain alternative elements and components, fewer elements or components, or additional elements or components. Elements or components of different embodiment examples can be combined with one another unless otherwise stated. Modifications and alterations which are described for one of the embodiment examples may also be applicable to other embodiment examples. Like or comparable elements in the various FIGS. are designated by the same reference numerals and not mentioned repeatedly so as to prevent repetition. The drawings show:

FIGS. 25a-25f schematic diagrams illustrating a method for the production of first optical elements;

DETAILED DESCRIPTION OF THE DRAWINGS

Figure 1A:
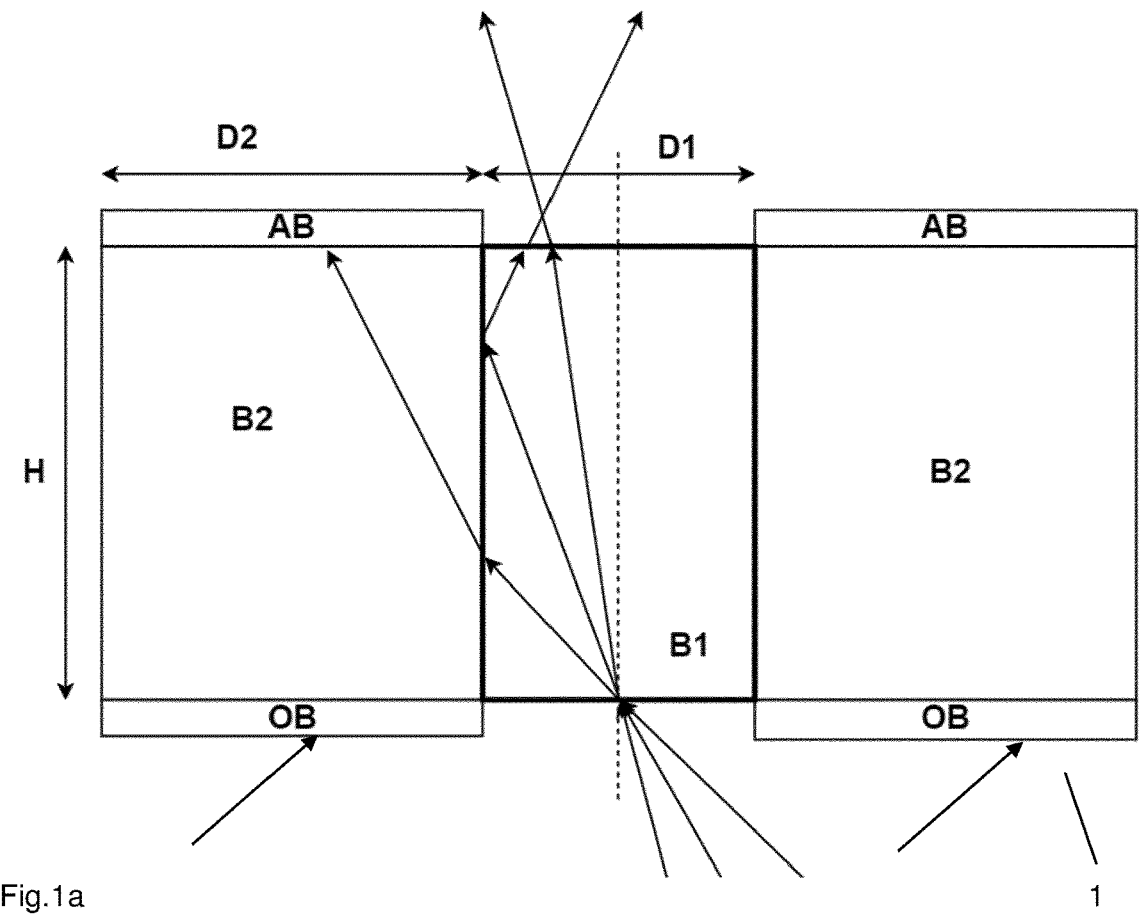
FIG. 1a the schematic diagram (sectional view) of a first optical element in a first embodiment in a first state in which only rays falling under case a) are coupled out of the optical element.

The drawings are not to scale and are merely schematic depictions. Moreover, for the sake of clarity, only a few light rays are depicted as a rule, although there are many such light rays in reality.

An exemplary two-dimensionally extensive first optical element 1 comprises first regions B1 comprising at least a first transparent material with a first refractive index N1 and second regions B2 comprising a second transparent material with a second refractive index N2 which alternate over the surface of the first optical element 1 in a one-dimensional or two-dimensional periodic sequence. The first refractive index N1 is higher than the second refractive index N2 within the entire wavelength range visible to the human eye. The first optical element 1 further comprises in each instance an at least temporarily opaque first layer OB at the underside of each of the second regions B2 and in each instance an at least temporarily opaque second layer AB at the upper side of each of the second regions B2. "At least temporarily" means here that the layer is either permanently opaque or is switchable between an opaque state and a transparent state. Insofar as the layer is permanently opaque, it must be switchable. "Upper side" means here generally the light exit side of the optical element 1 and, in this instance, specifically the light exit surface of the first regions or second regions. The underside corresponds in an analogous manner to the light entry side of the optical element 1 and, in this instance, specifically to the light entry surface of the first region or second region. An observer or user of the optical element sees the upper side of this element from which the light exits.

Because of the first layers OB, light which impinges on the optical element 1 on the light entry side is incident in the optical element 1 exclusively through the light entry surfaces of the first regions B1 when these first layers OB are in an opaque state and, depending on the incident angle, polarization and the ratio of the first refractive index N1 to the second refractive index N2, is either a) totally internally reflected—or propagated in an unimpeded manner—inside of a first region B1 and thereafter coupled out again at a light exit surface of the corresponding first region B1, or b) penetrates from the first region B1 into an adjoining second region B2, propagates therein and is ultimately absorbed at the light exit side thereof when the second layer AB is in the opaque state or is coupled out when the second layer AB is in the transparent state, or c), in case the light has penetrated from the first region (B1) into the adjoining second region (B2), penetrates in turn into a further adjacent first region (B1) and, depending on the propagation direction and polarization which then exist, is coupled out at the light exit surface or propagated further in the optical element (1) until it is either coupled out or absorbed. The end result is that the light exiting from the optical element (1) on the light exit side is limited with respect to its propagation directions relative to the light incident on the optical element (1) on the light entry side. In principle, all of the light rays which do not come under case a) or case b) come under case c). In practice, there are a multitude of first regions B1 and second regions B2 on the first optical element 1.

In addition, FIG. 1a shows the schematic diagram of such a first optical element 1 in a first embodiment in a first state (i.e., the first layer OB and second layer AB are opaque) in which only rays falling under case a) are coupled out of the optical element 1. These rays have limited propagation directions compared to the rays incident on the optical element 1 from below. Rays falling under the above-described case b) are absorbed at the second layers AB. Light incident on the first layers OB from below is likewise absorbed. With respect to the dimensioning, D1 refers to the width of the first regions B1, D2 designates the width of the second regions B2, and H designates the same height of both regions B1 and B2. For special cases of application, the first regions B1 and second regions B2 could also have different heights within certain limits.

Figure 1B:
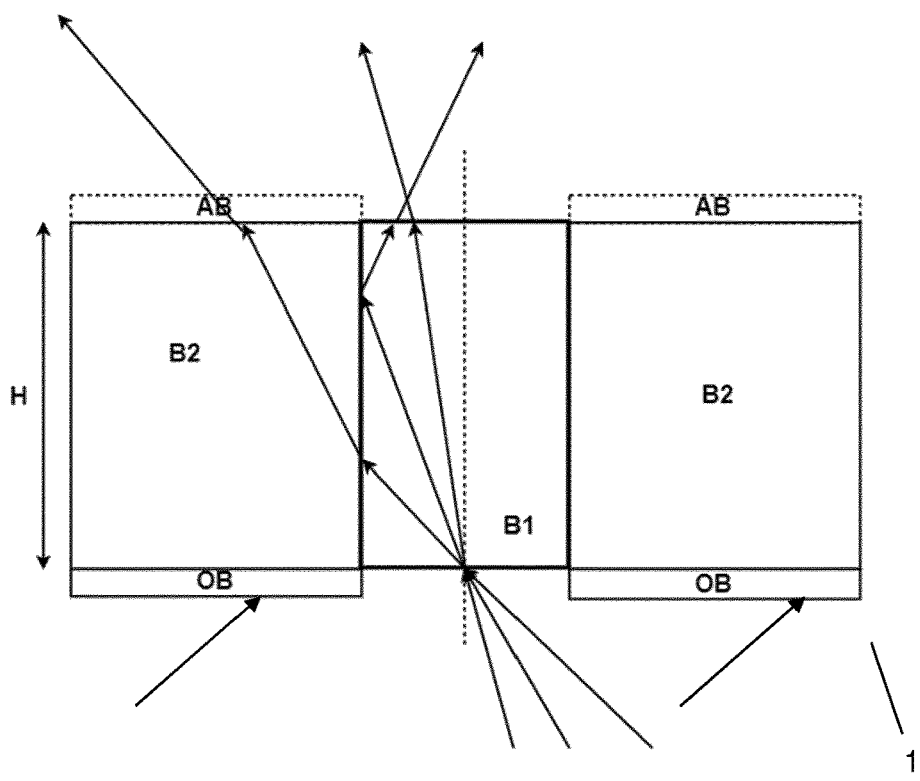
FIG. 1b the schematic diagram (sectional view) of a first optical element in a first embodiment in a second state in which only rays falling under cases a) and b) are coupled out of the optical element.

Further, FIG. 1b shows the schematic diagram of a first optical element 1 in a first embodiment in a second state in which only rays falling under cases a) and b) are coupled out of the optical element 1. In this respect, the top, second, layer AB is in a transparent state (shown in dashes). The angular spectrum of the light exiting from the top of the optical element 1 is accordingly appreciably wider compared with the light under the conditions depicted in FIG. 1a, where only light rays falling under case a) exit.

Figure 1C:
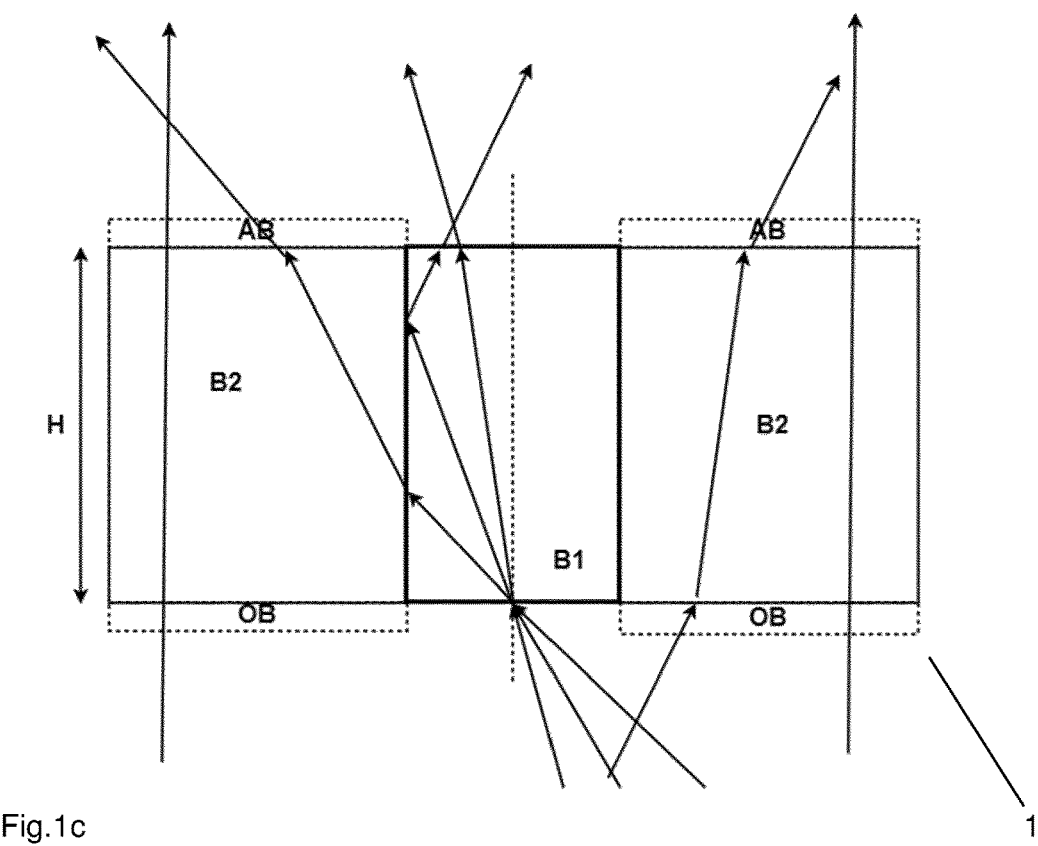
FIG. 1c the schematic diagram (sectional view) of a first optical element in a first embodiment in a third state in which no rays are absorbed but are merely displaced and/or totally internally reflected.

Further, FIG. 1c shows the schematic diagram of a first optical element 1 in a first embodiment in a third state in which no rays are absorbed but rather are merely displaced and/or totally internally reflected. In this respect, the two layers AB and OB are switched to a transparent state (shown in dashes).

Figure 1D:
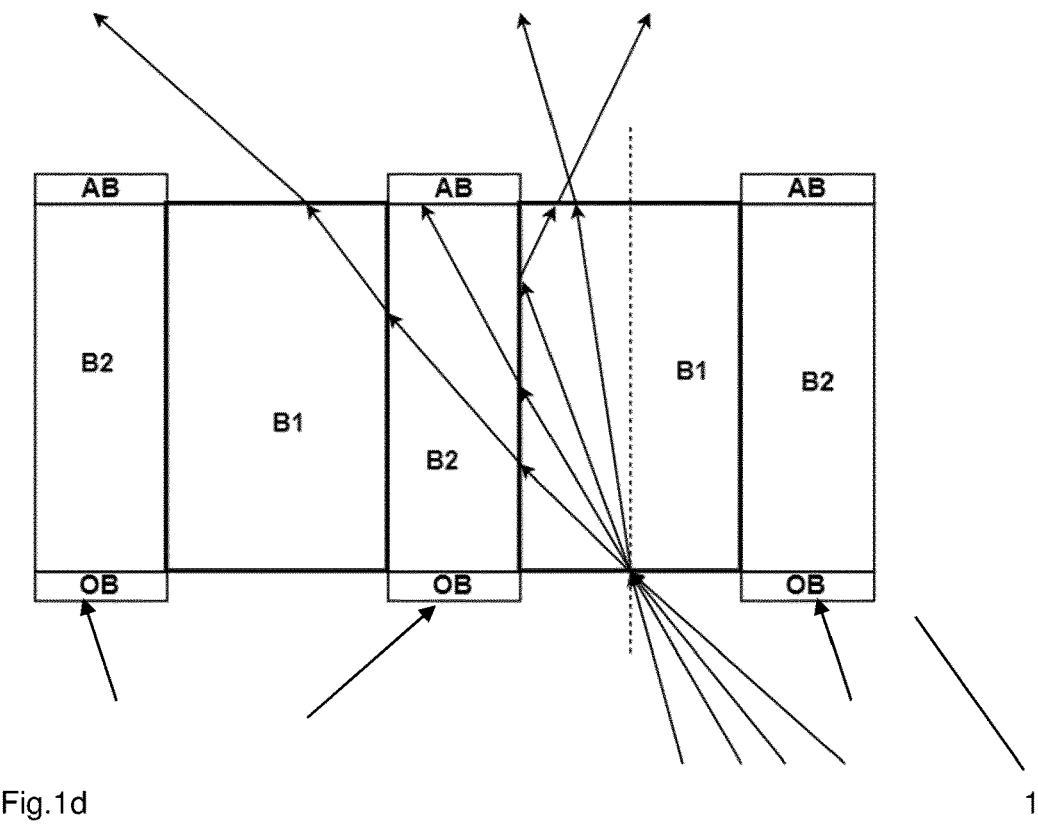
FIG. 1d the schematic diagram (sectional view) of an optical element in a second embodiment in a first state in which only rays falling under cases a) and c) are coupled out of the optical element.

Finally, FIG. 1d shows the schematic diagram of a first optical element 1 in a second embodiment in a first state (i.e., the two layers AB and OB are opaque) in which only rays falling under cases a) and c) are coupled out of the optical element 1. This third case c) for rays which, after overcoming the refractive index boundary from B1 to B2, in turn overcome the next refraction index boundary B2 to the next adjacent region B1 and, depending on the propagation direction and polarization which then exist, are coupled out or propagate further in the optical element 1 until they are either coupled out or absorbed, is relevant for special cases of application such as when light propagation directions in medium angular ranges of approximately 30° to 50° are to be absorbed but light impinges on larger and smaller angles. The cases falling under c) can be included or excluded based on optical simulation of the optical element through suitable dimensioning of the first refractive index N1 and second refractive index N2 and suitable choice of the widths of the first regions B1 and second regions B2 and the height thereof.

In order to achieve the preferred limiting of the propagation directions of the incident light (i.e., there are only rays falling under case a) as shown in FIG. 1a), it is important that the two at least temporarily opaque first layers OB and second layers AB are actually opaque. Once one of the layers, for example, the second layer AB, is not opaque, oblique light rays which penetrate into second regions B2 above the actual critical angle of total internal reflection at the interface between B1 and B2 can exit in an unwanted manner at the upper edges thereof through the non-opaque second layer AB.

Figure 2:
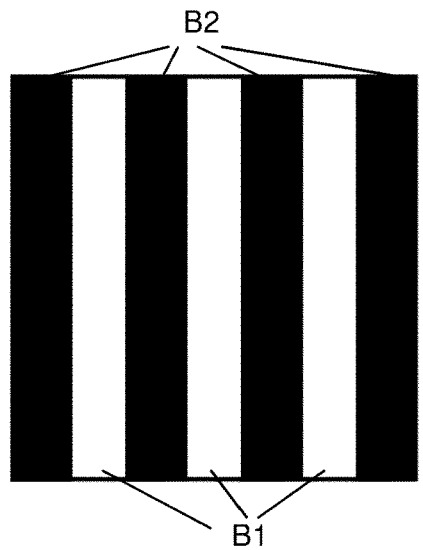
FIG. 2 the schematic diagram of first regions and second regions of an optical element viewed in parallel projection perpendicular to the optical element, wherein the first regions and second regions are arranged so as to be distributed in alternating stripes over the surface of the optical element.

Further, FIG. 2 shows the schematic diagram of the first regions B1 and second regions B2 of a first optical element 1 viewed in parallel projection perpendicular to the optical element 1 (i.e., a top view), wherein the first regions B1 and second regions B2 are arranged so as to be distributed in alternating stripes over the surface of the optical element 1. Accordingly, the limiting of the light propagation directions would be effective perpendicular to the stripe-shaped first regions B1 and second regions B2, but not parallel to them.

Figure 3A:
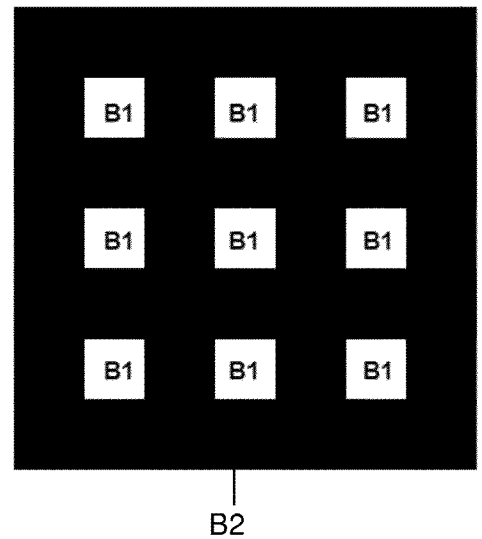
FIG. 3a the schematic diagram of the first regions and second regions of an optical element viewed in parallel projection perpendicular to the optical element, wherein the first regions are arranged so as to be distributed in rectangular shapes over the surface of the optical element and are completely enclosed by the second region.

Alternatively, FIG. 3a again shows the schematic diagram of the first regions B1 and second regions B2 of a first optical element 1 viewed in parallel projection perpendicular to the optical element 1 (i.e., also in a top view). In this case, the first regions B1 are arranged so as to be distributed over the surface of the optical element 1 in rectangular shapes and are completely enclosed by an individual second region B2 (in black), i.e., the second regions B2 or the second region B2 are/is shaped in a complementary manner. Accordingly, the limiting of the light propagation directions would be effective in each instance in at least two planes oriented perpendicular to the surface of the optical element 1. In practice, the effect of such an optical element 1 is generally that the light propagation directions are focused at every angle close to the perpendicular bisectors of the optical element or parallel thereto. By "close to" is meant in this case that the deviations from the perpendicular bisectors or parallels are less than 25° or 30° depending on the embodiment.

Figure 3B:
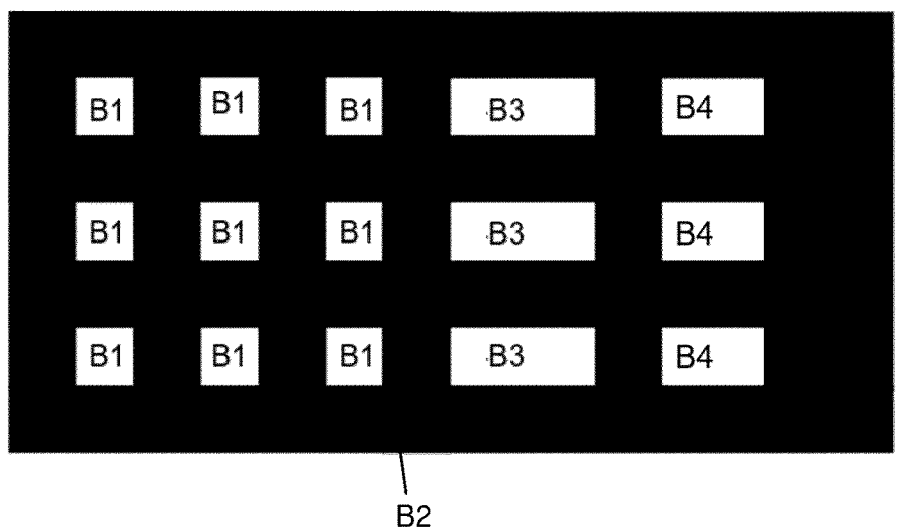
FIG. 3b the schematic diagram of first to fourth regions of an optical element viewed in parallel projection perpendicular to the optical element, wherein the first, third and fourth regions are arranged so as to be distributed in rectangular shapes over the surface of the optical element and are completely enclosed by the second region.

Beyond this, FIG. 3b shows the schematic diagram of a plurality of regions B1 to B4 of an optical element 1 viewed in parallel projection perpendicular to the optical element, wherein the regions B1, B3 and B4 are arranged so as to be distributed in rectangular shapes over the surface of the optical element and are completely surrounded by region B2. In addition to the first regions B1 and second regions B2, this optical element 1 also has further regions B3 and B4. Regions B1, B3 and B4 have different parameters in each instance with respect to shape and/or refractive index. Because of this, light which penetrates these regions B3 and B4 and exits from the optical element 1 undergoes limitations of the propagation directions that differ from those in regions B1. Accordingly, regions with differently limited light propagation directions—in a way, with different focusing—are distributed over the optical element 1. All of the variants shown in FIGS. 2, 3a and 3b can easily be combined under the conditions according to FIGS. 1a to 1d. Other shapes of the first regions B1 and second regions B2 are also possible. In this regard, it is always important for maintaining the functioning of the invention that the first regions B1 and second regions B2 directly optically adjoin one another such that, if possible, there is no air gap in the optical transition between refractive indices.

Advantageous embodiments are configured in such a way that every first at least temporarily opaque layer OB is formed at the underside, i.e., the light entry surface, of the second regions B2 by a permanent absorber layer and/or by at least one downwardly reflecting layer. If only one reflective layer is provided, it will, of course, also have opaque characteristics. The reflective characteristics contribute to increasing efficiency such as when an optical element 1 is installed in an illumination device such as for an LCD panel. It is further possible that every at least temporarily opaque second layer AB is formed at the upper side, i.e., the light exit surface, of the second regions B2 by a permanent absorber layer. If both layers have permanent opaque characteristics in particular static embodiments and the first refractive index N1 and second refractive index N2 are unchangeable, the optical element 1 is permanently limiting for the propagation directions of the light incident upon it.

If on the other hand, in other switchable embodiments of the invention, at least one of the two layers AB and/or OB of the first optical element 1 are/is switchable between an opaque state and a transparent state, the characteristic of the limiting of the propagation directions of the light incident on the optical element 1 can be switched on and off in this manner: exclusively in the case that both layers AB and OB are opaque, the light propagation directions are limited (case a)—see FIG. 1). Once one of the two layers AB or OB is not opaque, the limiting of the light propagation directions is no longer operative (cases a) and b) and possibly c) as is shown, inter alia, in FIG. 1b). Accordingly, the optical element 1 is switchable. Even in case both layers AB and OB should be switched to transparent as is shown in FIG. 1c, the optical element 1 merely causes—depending on the incident direction of light—displacements of rays and changes in direction by means of total internal reflections at the boundaries between the first regions B1 and the second regions B2 but does not block any light on the whole.

In preferred switchable embodiments, only the upper, second, layer AB is configured so as to be switchable between opaque and transparent, while the lower, first, layer OB is formed to be a permanently opaque (and possibly also reflective). This is sufficient to achieve the desired effects.

Figure 23:
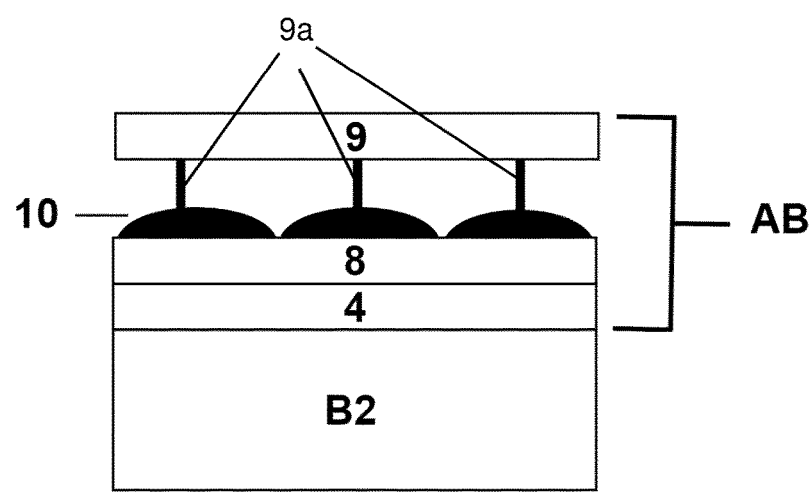
FIG. 23 the further development of a first optical element of the first embodiment to a switchable twelfth embodiment, in this instance in the first state (detail view)
Figure 24:
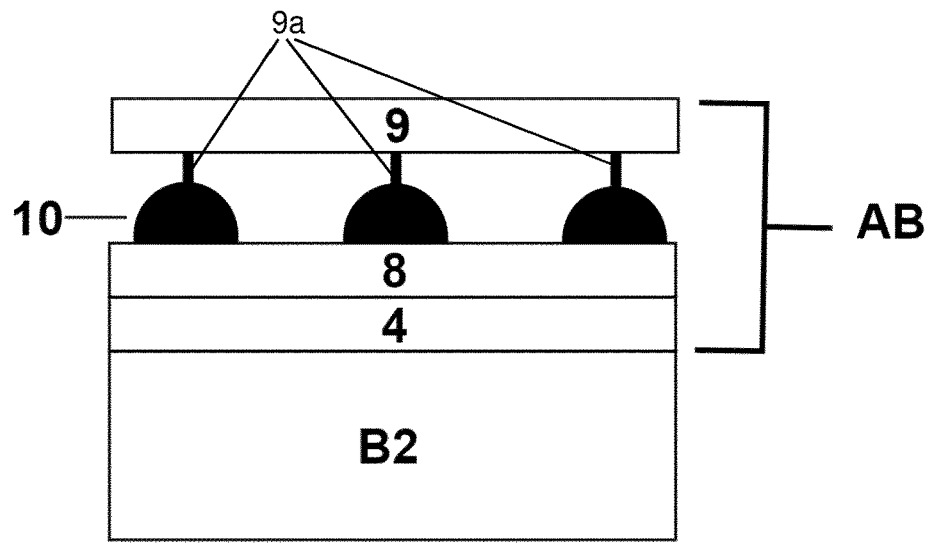
FIG. 24 the further development of a first optical element of the first embodiment to a switchable twelfth embodiment, in this instance in the second state (detail view)
Figure 25A:
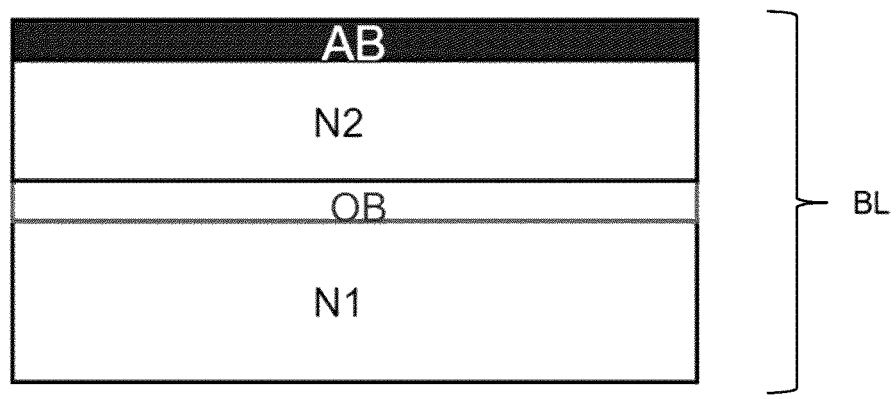

The switchability of the first layer OB and second layer AB can preferably be based on one or more of the following principles simultaneously: electrowetting, electrophoresis, electrochromism and/or liquid crystal cells. In case of electrowetting, at least two states of the opaque liquid amounts subject to the electrowetting would be defined for the relevant first layer OB and/or second layer AB. In this respect, FIG. 23 shows a detail view of the further development of a first optical element 1 of the first embodiment as a switchable twelfth embodiment, in the present instance in the first state, corresponding to FIG. 1a. On the other hand, FIG. 24 shows a detail view of the further development of a first optical element 1 of the first embodiment as a switchable twelfth embodiment, in the present instance in the second state, corresponding to FIG. 1b. In both of the configurations shown in FIG. 23 and FIG. 24, at least the following components are provided: at least one planar indium tin oxide (ITO) electrode 4, a planar insulator layer 8, a planar electrode 9 which projects past thin electrodes 9a protruding from the surface into the liquid droplets 10, a controllable voltage source, not shown, which is contacted by the planar ITO electrode 4 and planar electrode 9, and opaque liquid droplets 10 which are disposed between the insulator layer 8 and the electrode 9 and which are possibly embedded in a gel matrix or transparent liquid and subjected to the electrowetting effect.

In a first operating state according to FIG. 23, the liquid droplets 10 of the second layer AB would cover the corresponding surface of a second region B2 as completely as possible, i.e., would be opaque (there would accordingly be limiting of the propagation directions). In a second operating state according to FIG. 24, the liquid droplets 10 of the second layer AB would cover only the smallest possible area of the corresponding surface of a second region B2, i.e., would be extensively transparent (there would accordingly be no limiting of the propagation directions). To this end, the voltages required for the above-mentioned states would be adjusted at the voltage source.

In the case of electrophoresis, opaque particles which can move by electrophoresis would be provided in a liquid or in a gel matrix for a first layer OB and/or second layer AB. Because of the effect of an electric field which can be applied via transparent electrodes, the latter would then cover the corresponding surface of a second region B2 as completely as possible in a first operating state as relevant first layer OB or second layer AB such that the relevant layer OB or AB acts opaquely (there is limiting of the propagation directions). In a second operating state with a different electric field distribution, the particles, as first layer OB or second layer AB, would cover the corresponding surface of a second region B2 on the smallest possible surface or would be moved into a reservoir or distributed in the volume, i.e., the layer would consequently be transparent (there is no limiting of the propagation directions).

A modification is also possible by substituting opaque particles which are movable by electrophoresis for the two layers OB and/or AB. Such particles would then either directly contact the surfaces of the second regions B2, i.e., at the locations of the two layers OB and/or AB, in order to frustrate total internal reflection and generate an opaque state, or—after electrophoretic movement—be arranged at a maximum distance of 100 μm in order to allow a total internal reflection at the above-mentioned locations and, accordingly, let light propagate further in the optical element until it is coupled out in first regions B1.

Figure 22:
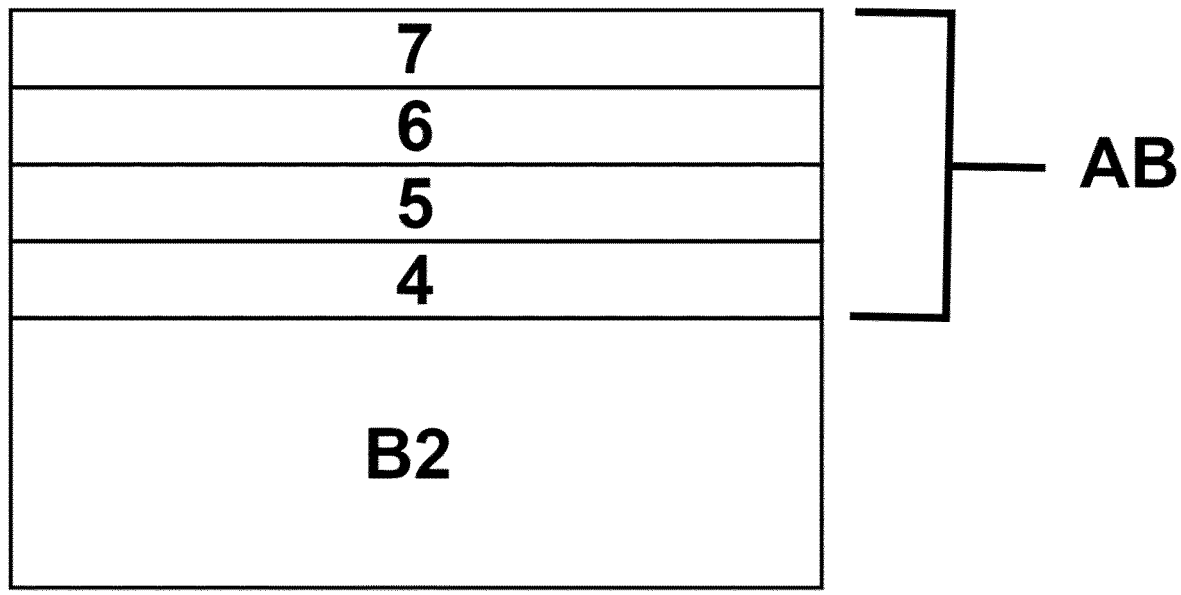
FIG. 22 the further development of a first optical element of the first embodiment to a switchable eleventh embodiment (detail view)

FIG. 22 shows the further development of a first optical element 1 as detail view of the first embodiment as a switchable eleventh embodiment. In order to form the second layer AB, there are provided at least transparent electrodes 4 and 6, a controllable voltage source, not shown, which is contacted by the transparent electrodes 4 and 6, at least one electrochromic layer 5 and, optionally, a protective layer 7, e.g., glass or a polymer. In the case of electrochromism, the layer 5 would be formed with an electrochromic material, e.g., a metal oxide (such as $TiO_2$, NiO, $Nb_2O$, $MoO_3$, $Ta_2O_5$, $WO_3$, $IrO_2$ or $Zr_2O_5$), and corresponding transparent electrodes 4, 6 such as, e.g., ITO (indium-doped zinc oxide), FTO (fluorine-doped tin oxide) or AZO (aluminum-doped zinc oxide) in which the electrochromic materials 5 are embedded. Depending on the voltage applied to the electrodes 4, 6, at least two states are defined for the electrochromic layer 5 and therefore similarly for the second layers AB. The second layer AB is opaque (there is limiting of the propagation directions) in a first operating state and transparent (no limiting of the propagation directions) in a second operating state. This applies in an analogous manner for the first layers OB.

The first layers OB and/or the second layers AB can also be formed as liquid crystal cells such as TN cells (twisted nematic liquid crystal cells) with corresponding polarizer pairs. The liquid crystal cells can then be switched to opaque (there is limiting of the propagation directions) or transparent (there is no limiting of the propagation directions) correspondingly via the application of corresponding electric fields or voltages to electrodes.

Figure 4:
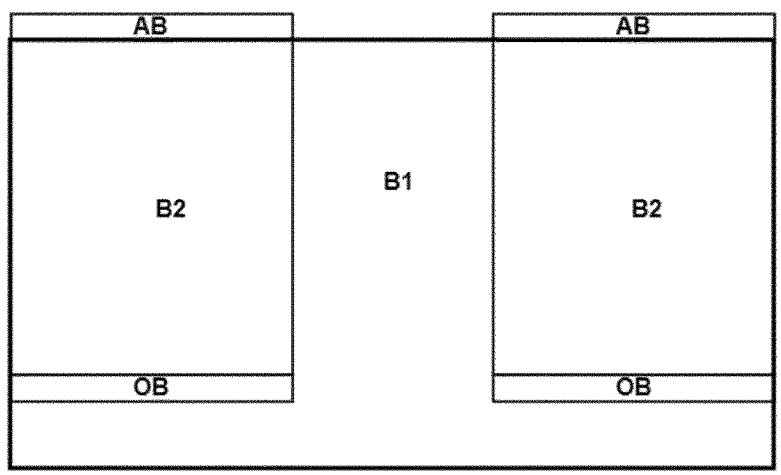
FIG. 4 the schematic diagram (sectional view) of a first optical element in a third embodiment.
Figure 5:
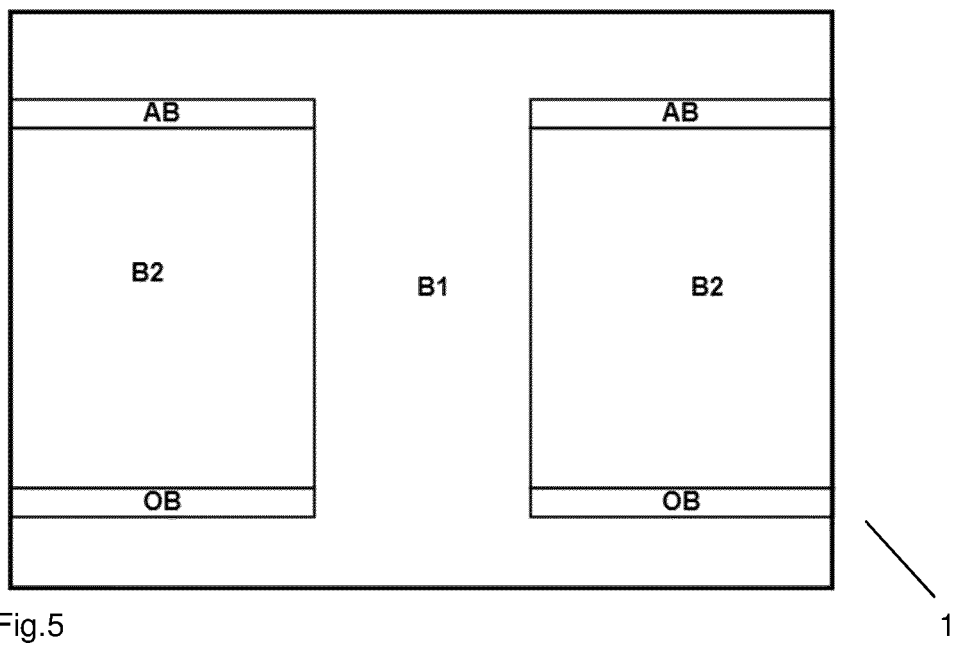
FIG. 5 the schematic diagram (sectional view) of a first optical element in a fourth embodiment.

Further, it can be advantageous when the first layers OB and/or second layers AB are embedded in the material of which the first regions B1 are composed. The material portion of the first regions B1 of the optical element 1 preferably transitions seamlessly into the above-mentioned portion in which the corresponding layers are embedded. In this regard, FIG. 4 shows the schematic diagram of a first optical element in a third embodiment and FIG. 5 shows the schematic diagram of a first optical element in a fourth embodiment. The material of the first region B1 with the first refractive index N1 can be the same material as that of a substrate formed in the manner described above referring to FIG. 4. Alternatively, it is contemplated that the second regions B2 are completely enveloped by material of the first regions B1 with the first refractive index N1 as is shown in FIG. 5.

Figure 6A:
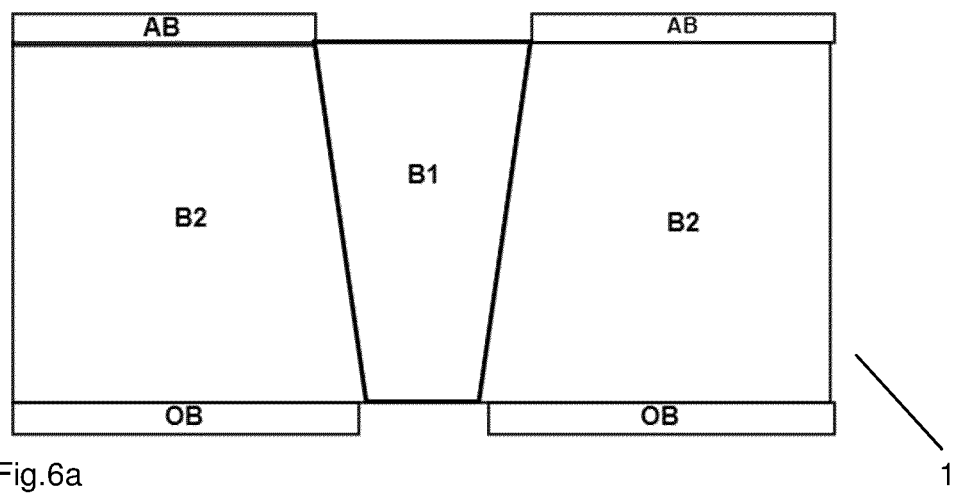
FIG. 6a the schematic diagram (sectional view) of a first optical element in a fifth embodiment.
Figure 6B:
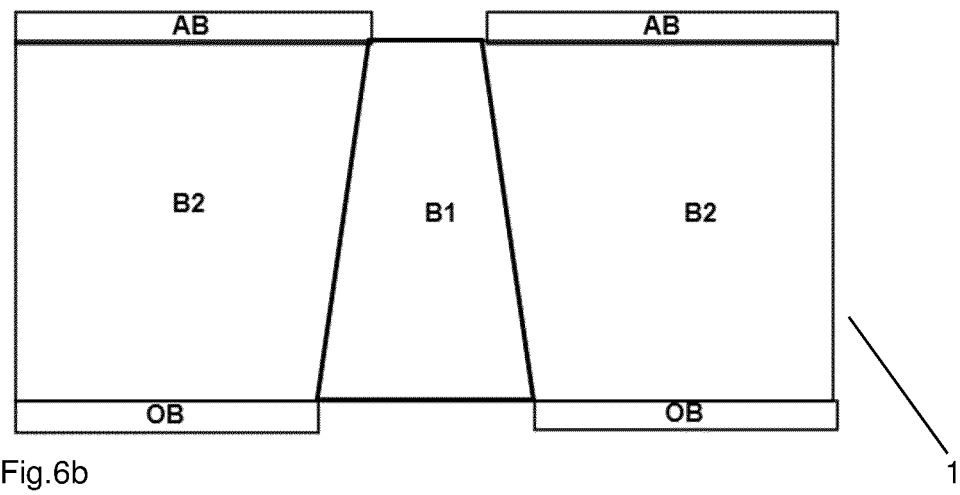
FIG. 6b the schematic diagram (sectional view) of a first optical element in a sixth embodiment.
Figure 6C:
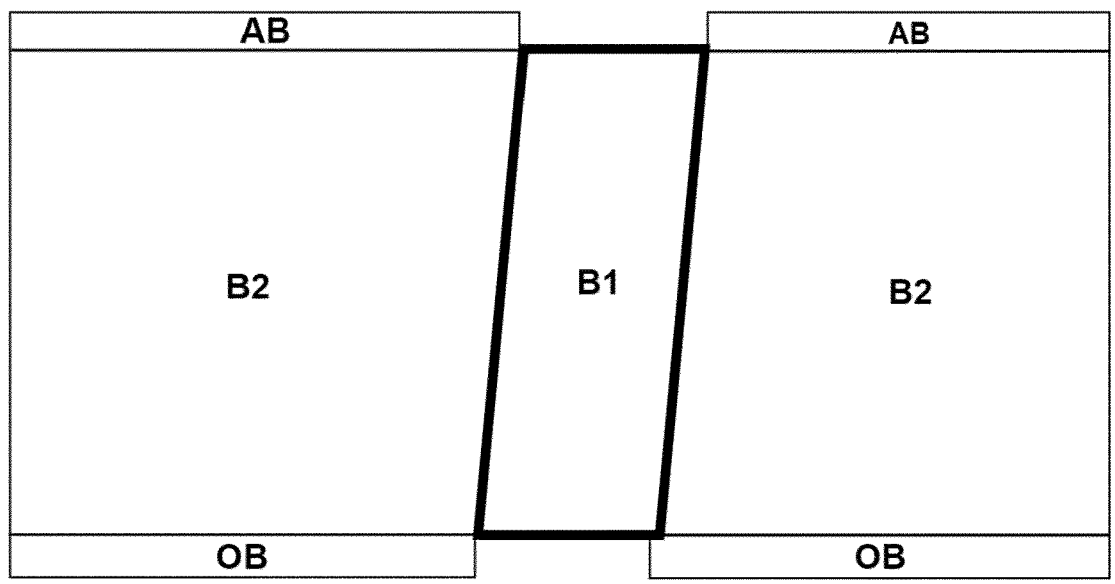
FIG. 6c the schematic diagram (sectional view) of a first optical element in a seventh embodiment.

Further embodiments provide that the first regions B1 and second regions B2 are formed in trapezoid shape viewed in sectional direction perpendicular to the upper surface of the optical element 1. In this regard, FIGS. 6a to 6c show schematic diagrams of a first optical element 1 in a fifth, sixth and seventh embodiment. As a result of such embodiment forms of the first regions B1 and second regions B2, the propagation directions of the light exiting from the optical element 1 are selectively influenced: the focusing of light taking place over the surface is sharper (FIG. 6a) or weaker (FIG. 6b) depending on the embodiment. Further, it is possible, such as by parallelogram-shaped sections (FIG. 6c) of the first regions B1 and second regions B2, for example, to achieve a peak shift through the accompanying tilting of the interfaces between the first regions B1 and second regions B2.

Figure 7:
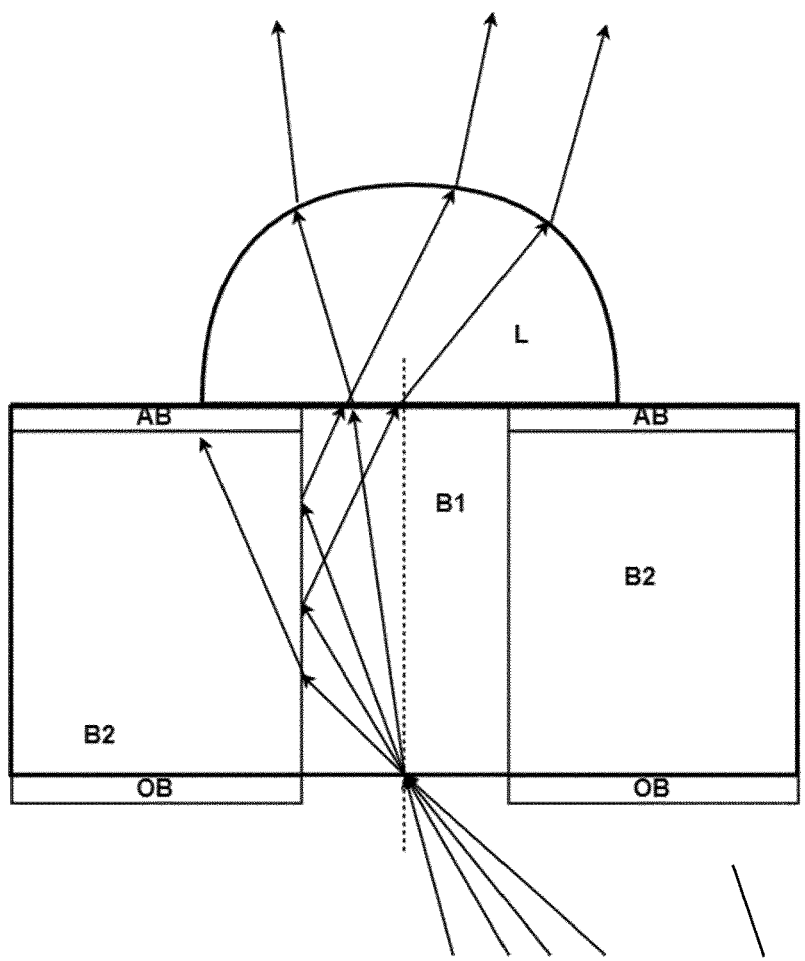
FIG. 7 the schematic diagram (sectional view) of a first optical element in an eighth embodiment.

Beyond this, it is possible to apply a lens structure L, preferably a convex lens structure, on at least some of the first regions B1 of an optical element 1, preferably on all of the first regions B1, on the upper side, i.e., the light exit side, thereof. This assists in the defined influencing of the propagation direction of the light exiting from the optical element 1. In this regard, FIG. 7 shows the schematic diagram of a first optical element 1 in an eighth embodiment. Alternatively or additionally, the underside, i.e., the light entry side, of the first regions B1 can have a concave or convex lens structure, not shown, in order to influence the light input directions into the first regions B1 and, accordingly, to also exert influence on whether or not a light ray ultimately falls within the above-mentioned cases a), b) or c). The terms "upper side" and "underside" are meant with reference to an observer for whom the optical element is installed in a display device and who perceives only the light exit side of the first optical element 1 that faces the observer and therefore forms the upper side.

Figure 8:
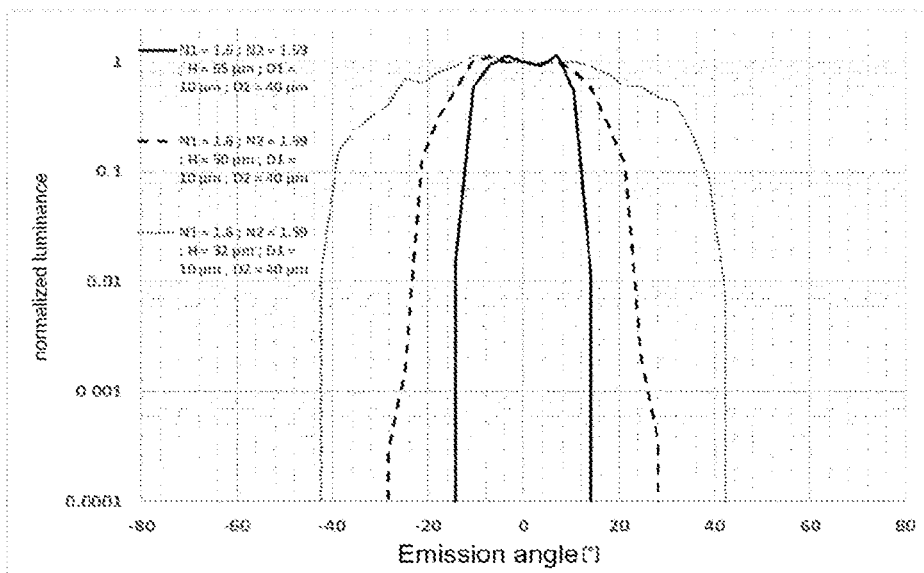
FIG. 8 the simulation of the normalized luminance for three sets of parameters for light exiting from a first optical element of the first embodiment, plotted over the emission angle.

FIG. 8 shows the simulation of the normalized luminance for three sets of parameters for light exiting from a first optical element 1 in the first embodiment, plotted over the emission angle. This is based on the conditions referring to FIG. 1*a* and FIG. 2. The opacity of the first layers OB and of the second layers AB is assumed to be 100%. It will be seen very clearly that a top hat distribution is achieved with the small difference in refractive index of 0.01 between N1=1.6 and N2=1.59. It will further be appreciated that the cancelation at larger angles can be achieved with a factor of optional magnitude. In this calculation example, the height H of the first regions B1 and second regions B2, which is identical for both, varies over 32 µm, 50 µm and 60 µm. The greater the height H, the narrower the angular range of the out-coupled light. All of the out-coupled light is associated with case a).

In other words, the operative mechanism is as follows: when rays impinge on the interface between the first regions B1 and second regions B2 (i.e., from the first refractive index N1 to the second refractive index N2), they are either totally internally reflected or refracted into the second regions B2 (with refractive index N2) depending on the angle of incidence. However, when the latter rays are refracted into the second regions B2 (with the second refractive index N2), a (smaller) portion is also reflected back again into the first regions B1 (Fresnel reflection). The smaller the difference in the refractive indices N1–N2, the smaller the portion that is reflected back. The greater the height H (which is subject to technical limitations relating to manufacture), the more this back-reflection effect is masked. Ideally, an almost perfect rectangular distribution is generated.

Figure 9:
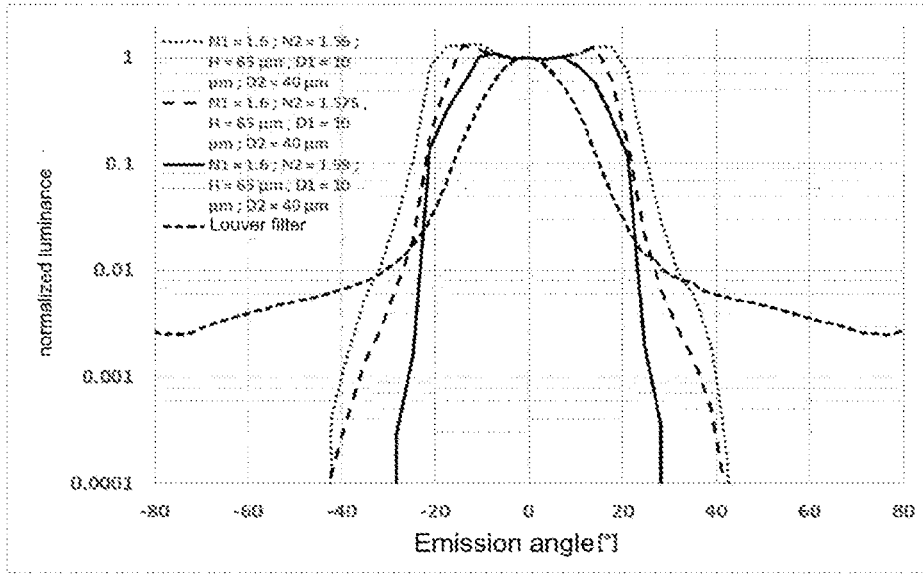
FIG. 9 the simulation of the normalized luminance for three further sets of parameters for light exiting from a first optical element of the first embodiment, plotted over the emission angle, compared to a louver filter.
Figure 10:
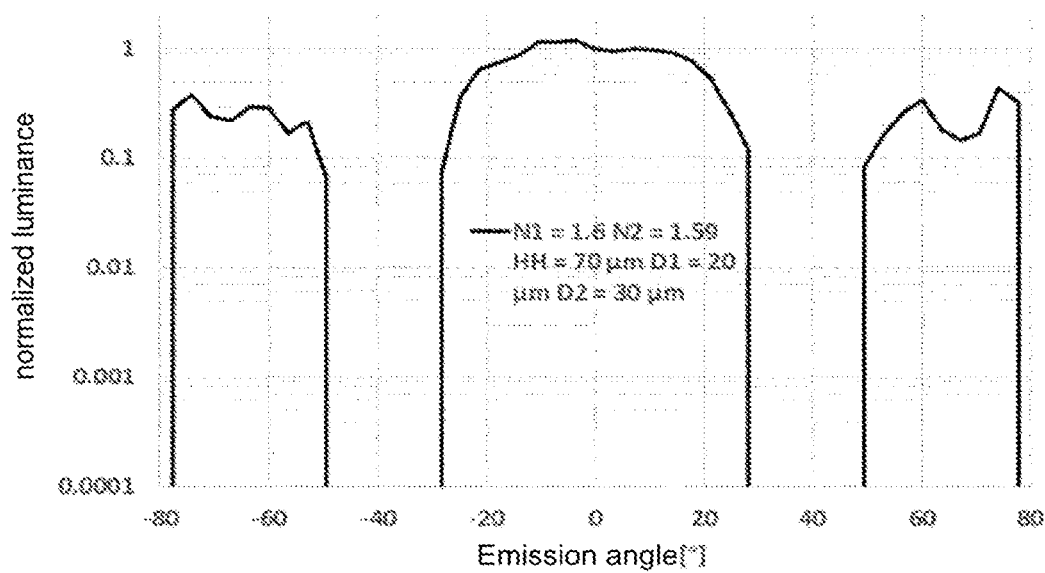
FIG. 10 the simulation of the normalized luminance for three sets of parameters for light exiting from a first optical element in the second embodiment, plotted over the emission angle.

The above-mentioned back-reflection has already been shown in FIGS. 8 to 10. The logarithmic ordinates in these figures should be taken into account. FIGS. 8 to 10 show exemplary parameters for optics-related technical dimensioning of the key parameters: width of the first regions D1, width of the second regions D2, identical height of the regions H, first refractive index N1 and second refractive index N2.

In addition, FIG. 9 shows a simulation of the normalized luminance based on the same assumptions for three further sets of parameters for light exiting from a first optical element 1 of the first embodiment. This time, with a fixed height H=65 µm, the second refractive index N2 and therefore also the difference in refractive indices varies between the first refractive index N1=1.6 and the second refractive index N2 (N2=1.56/1.575/1.59). It will be seen that a larger difference in refractive indices allows more light in lateral angles. All of the out-coupled light is associated with case a). There is also a top hat distribution in this case. The comparison with a conventional louver filter for limiting the light direction is also shown in FIG. 9. It will be clearly seen that a first optical element 1 according to the invention has substantially improved characteristics over the prior art, i.e., the louver filter. For one, the private viewing effect is improved by orders of magnitude—depending on the embodiment—from angles of 25° to approximately 30°. On the other hand, the invention has the desired top hat distribution. In contrast, in a louver filter which generally does not have a top hat distribution, the perceived luminance already fluctuates, depending on the configuration and viewing position, with a few degrees deviation from the perpendicular bisectors. Accordingly, it can drop by half when it is measured from an angle of more than 10° relative to the perpendicular bisectors.

In contrast, FIG. 10 shows the simulation of the normalized luminance for a set of parameters for light exiting from a first optical element 1 in the second embodiment, plotted over the emission angle. The disruptive distribution of the propagation angles impinged by light with lateral flanks is clearly shown. While the light associated with case a) lies in angles between approximately −28° and +28°, additional rays falling under case c) lie between approximately −50° to −77 and +50° to +77°.

Figure 11:
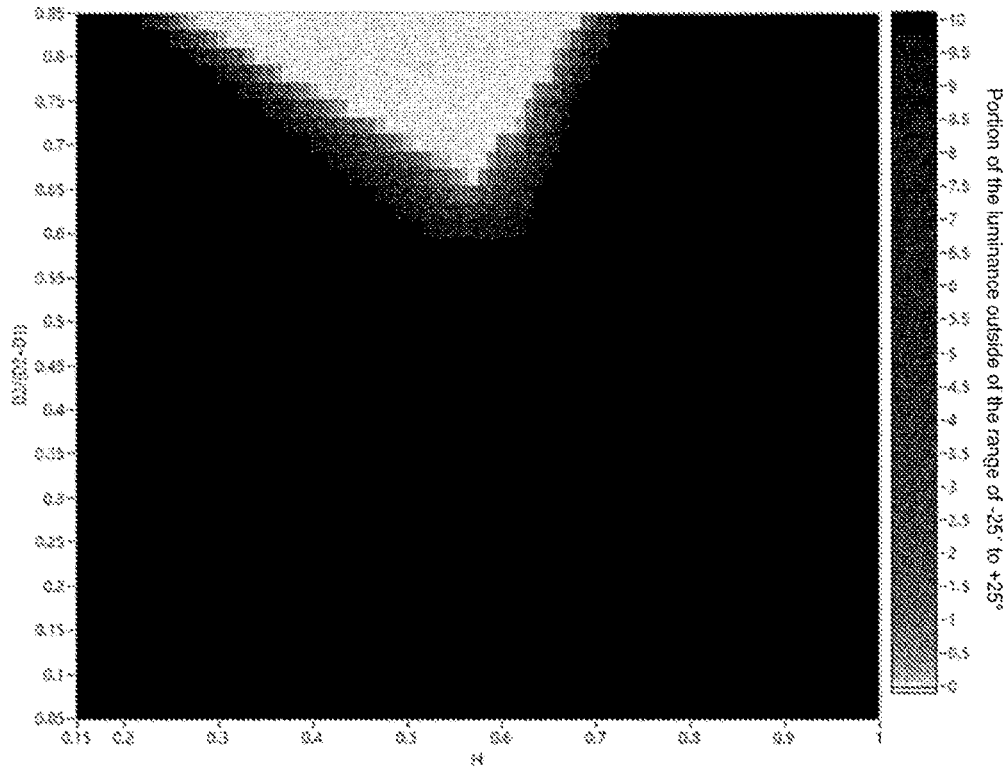
FIG. 11 the simulated component of the luminance outside the range of −25° to +25° for light exiting from a first optical element in the first embodiment.

Further, FIG. 11 shows the simulated portion of the luminance outside of the range of −25° to +25° (i.e., for light falling under case a)) for light exiting from a first optical element 1 in the first embodiment. The first and second refractive indices taken as a basis for the simulation are N1=1.6 and N2=1.59. Note the (light) parameter window at the top in which the component of the light coupled out in the above-mentioned angle range is largest. The person skilled in the art can derive values from this for the dimensioning of widths D1 and D2 and the height H for the first regions B1 and second regions B2 in order to optimize an optical element 1 for case a).

Figure 18:
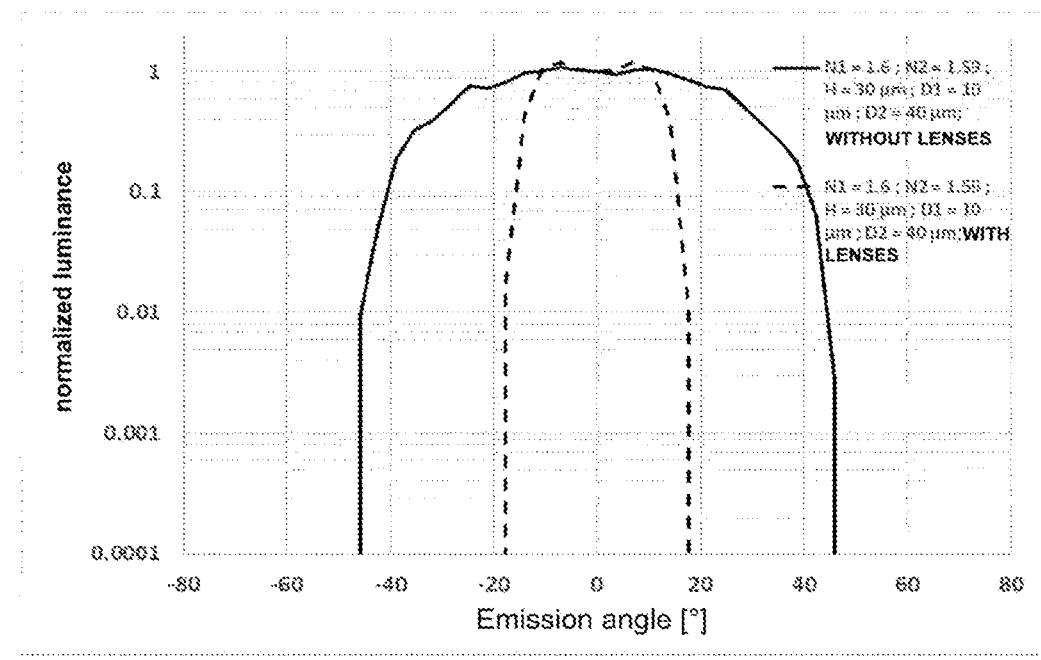
FIG. 18 comparison of the simulations of the normalized luminance for light exiting from a first optical element of the first and eighth embodiments, plotted over the emission angle.

Further, FIG. 18 shows the comparison of the simulations of the normalized luminance for light exiting from a first optical element 1 in the first embodiment (corresponding to FIG. 1*a*) and eighth embodiment (corresponding to FIG. 7) plotted over the emission angle. It will be noted that the use of lenses L without destroying a top hat distribution can appreciably improve the angle-limiting effect.

Figure 12:
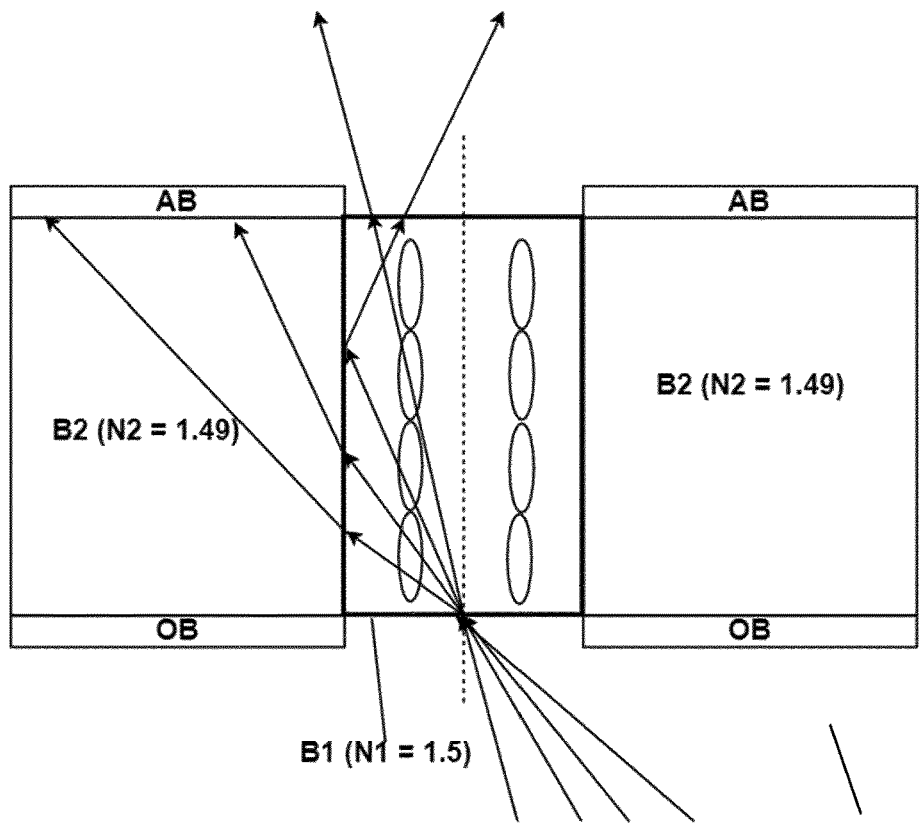
FIG. 12 the schematic diagram (sectional view) of a first optical element in a ninth embodiment in a first state in which only rays falling under case a) are coupled out of the optical element at a narrow range of angles.

In a particular embodiment of the optical element 1 according to the invention, the first refractive index N1 of the material in the first regions B1 and/or the second refractive index N2 of the material in the second regions B2 are/is switchable between at least two states such that the difference in refractive indices at the region boundaries and refractive index boundaries B1 to B2 can be modulated, as a result of which the aforementioned limiting of the propagation directions is variable. In this respect, FIG. 12 shows the schematic diagram of a first optical element 1 in a ninth embodiment in a first state in which only rays falling under case a) in a narrow angular range are coupled out of the optical element 1. In this instance, the second refractive index N2 equals 1.49 and the first refractive index N1 equals 1.5 with a corresponding orientation of the liquid crystals.

Figure 13:
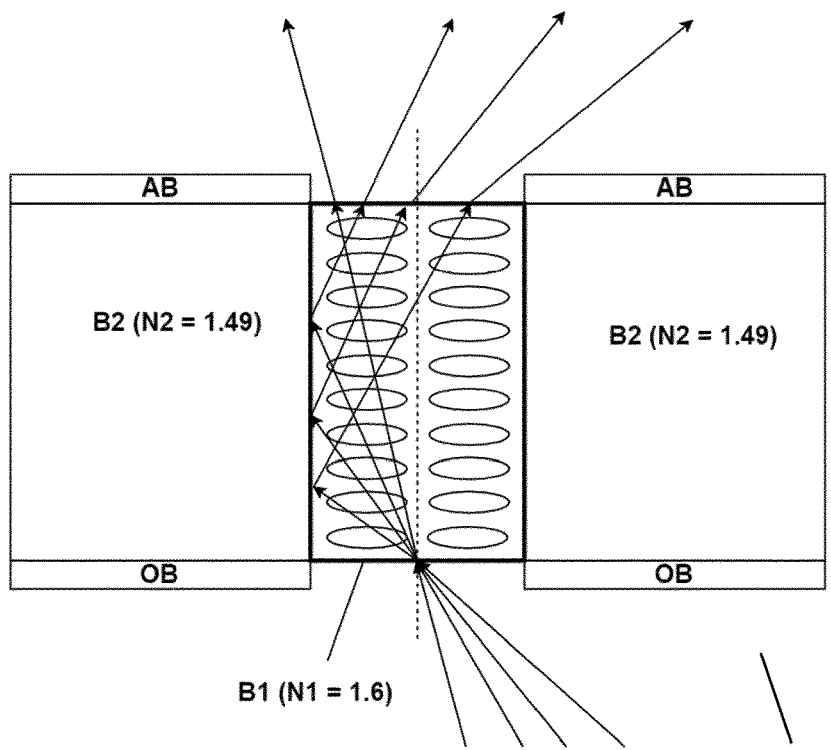
FIG. 13 the schematic diagram (sectional view) of a first optical element in a ninth embodiment in a second state in which only rays falling under case a), but in an expanded angular range compared to the conditions in FIG. 12, are coupled out of the optical element.
Figure 14:
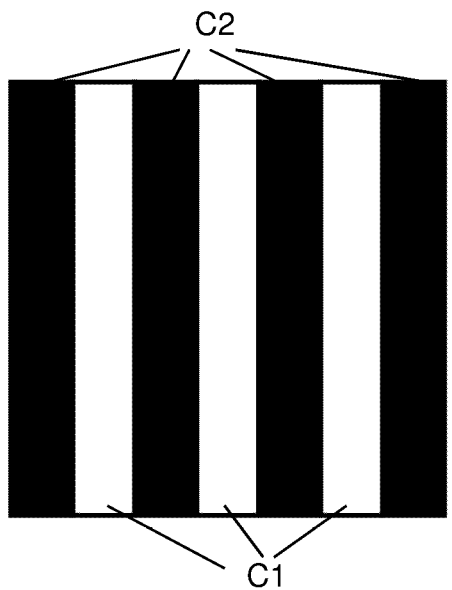
FIG. 14 the schematic diagram of regions C1 and C2 of a method, wherein these regions are arranged so as to be distributed in alternating stripes.
Figure 19:
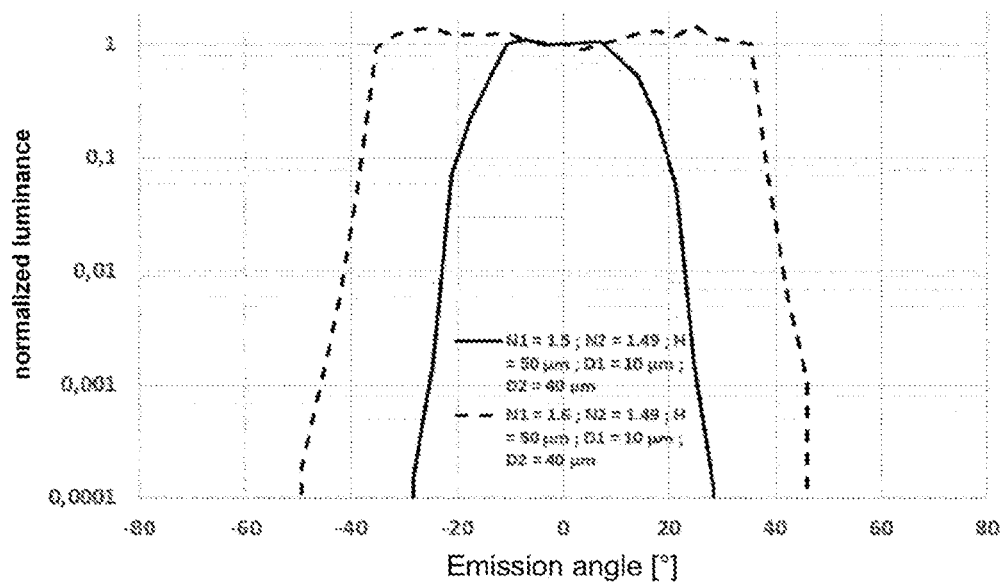
FIG. 19 comparison of the simulations of the normalized luminance for light exiting from a first optical element of the ninth embodiment in two states, plotted over the emission angle.

FIG. 13 shows the schematic diagram of a ninth embodiment of a first optical element 1 in a second state in which, again, only rays falling under case a) are coupled out of the optical element 1 but in an angular range that is expanded over that shown in FIG. 12. In this instance, the second refractive index N2 equals 1.49 and the first refractive index N1 equals 1.6 with a corresponding orientation of the liquid crystals. In this respect, FIG. 19 shows the comparison of the optical simulations of the normalized luminance for light exiting a first optical element 1 in the ninth embodiment in the two states corresponding to FIGS. 12 and 13, plotted over the emission angle. It can be clearly seen that the angle limiting is variable by means of the switchable configuration of the optical element 1 in the ninth embodiment described above.

In the above-mentioned ninth embodiment, at least one of the materials of the first regions B1 and/or second regions B2 can comprise liquid crystals which contact electrodes in order to bring about a change in the refractive index for linearly polarized light in the liquid crystals via a change of voltage at the electrodes. When they are arranged, for example, at the upper side and underside, i.e., the light exit surface and the light entry surface, of the first regions B1, the electrodes can be transparent, e.g., in the form of an ITO layer. It is noted with respect to this embodiment that the first layers OB and the second layers AB are preferably permanently opaque and that, further, as a rule, exclusively the light rays falling under case a) can exit upward from the optical element 1. However, these rays falling under case a) have a narrower or wider angular range of propagation directions depending on the difference in refractive indices at the interfaces from the first regions B1 to the second regions B2 as is shown in FIGS. 12, 13 and 19. The larger the difference in refractive indices, the wider the angular range, and the smaller the difference in refractive indices, the smaller this angular range. In principle, third, fourth and further states corresponding to other refractive index values can be adjusted in this ninth embodiment if this is required by an application.

Figure 17:
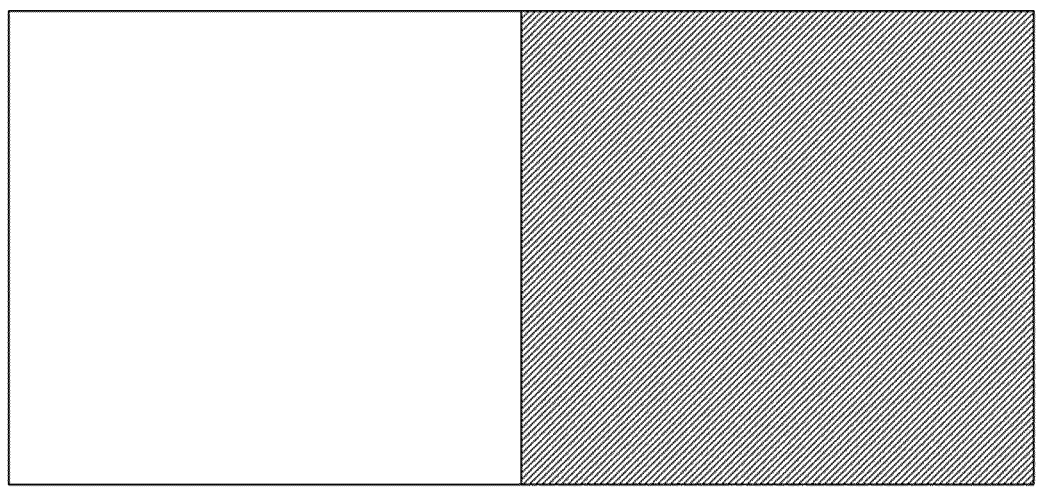
FIG. 17 a schematic diagram illustrating a first optical element in a tenth embodiment.

For particular cases of application it is possible that there is formed on the optical element 1 at least a first region B1 whose shortest dimension when viewed in parallel projection perpendicular to the optical element 1 is at least 20 times larger than the shortest dimension of all of the second regions B2 viewed in parallel projection perpendicular to the optical element 1. Accordingly, there is essentially no limiting of the propagation directions of the light exiting from the optical element 1 relative to the light impinging on the optical element 1 inside of the above-mentioned at least one first region B1, excluding at the edges thereof and with the exception of parallel shifts. In this respect, FIG. 17 shows a schematic diagram depicting a first optical element 1 in such a tenth embodiment. The unshaded half on the left-hand side would correspond, for example, to an individual complete first region B1, while the shaded half on the right-hand side has alternating first regions B1 and second regions B2 corresponding, for example, to the first to tenth embodiments of the optical element 1. This means nothing other than that the limiting of the propagation directions of light penetrating the optical element 1 does not act on the entire surface area of the optical element 1 but rather only on the—in this example—right-hand half.

Figure 20:
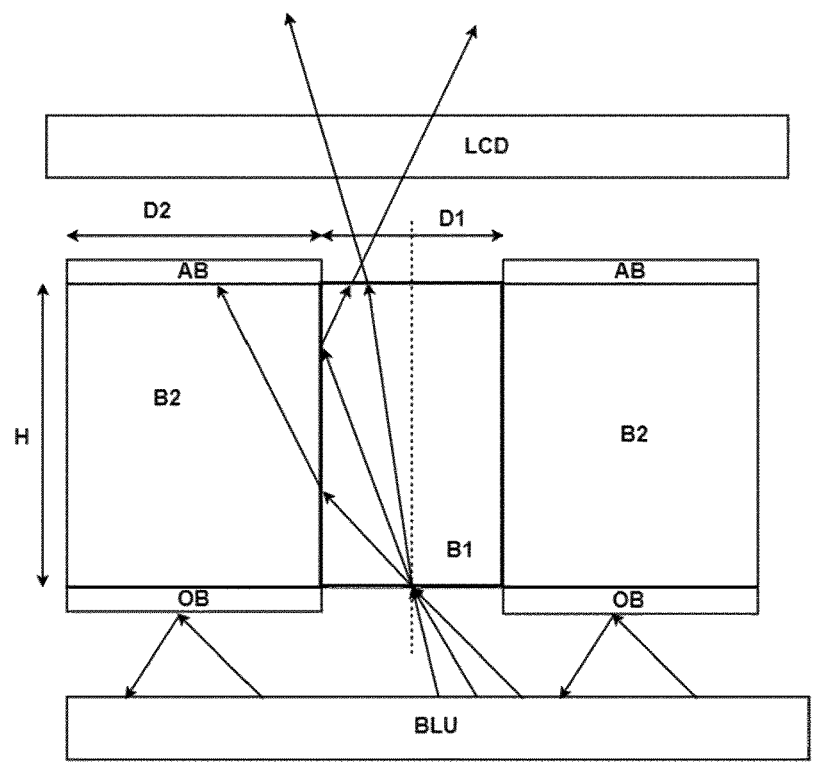
FIG. 20 the schematic diagram (sectional view) of a first optical element in a first embodiment in a first state, used with a transmissive display unit and a backlight.

The invention acquires particular significance in the use of a first optical element 1, as described above, having a display unit (e.g., an LCD panel, an OLED or micro-LED or any other display technology) or having an illumination device for a transmissive display unit. In this regard, FIG. 20 shows the schematic diagram (sectional view, detail) of a first optical element 1 in a first embodiment in a first state, specifically with the use of a transmissive display unit "LCD" and a backlight "BLU". Accordingly, the optical element 1, particularly in switchable embodiments, is integrated directly in a backlight BLU for a transmissive display unit such as an LCD module. In this instance, the permanently opaque layers OB at the underside are advantageously reflective so that light impinging at the underside is thrown back into the backlight BLU and is recycled in the latter as is indicated in the drawing. The light of the backlight BLU can accordingly penetrate exclusively into the first regions B1, where it undergoes the limiting of light directions according to the invention in the first state of the optical element 1 when the second layers AB are opaque. The display unit LCD is then penetrated only by light directed according to the invention and is visible only from a correspondingly limited angular range with the exception of scatter losses owing, for example, to the LCD panel itself. When a second state, not shown, of the optical element 1 is brought about in which the second layers AB are switched to transparent, a wide angular spectrum of light would penetrate the display unit LCD, and the display unit LCD would be visible from a wide viewing angle.

A switchable private view is achieved for the display unit LCD in the uses formulated above. In the first operating state, in which only the above-mentioned cases a) for the rays emerging from the optical element 1 remain, there results a private viewing effect with a top hat distribution depending on the embodiment. The top hat distribution is more comfortable for a viewer than a typical light distribution based on a louver filter because, with a louver filter, the freedom of movement is sharply limited. Even if the head moves to the side only by a few centimeters, there is a sharp visible drop in brightness (see also FIG. 9 for comparison). This is sometimes visible even if the head is not moving when the image display is large enough. This is sufficiently countered by the top hat distribution. In the second operating state, in which generally cases a) and b) and possibly also c) are applicable for the rays exiting from the optical element 1, a public viewing mode is provided in which the display unit LCD can be viewed freely from all directions.

Figure 21:
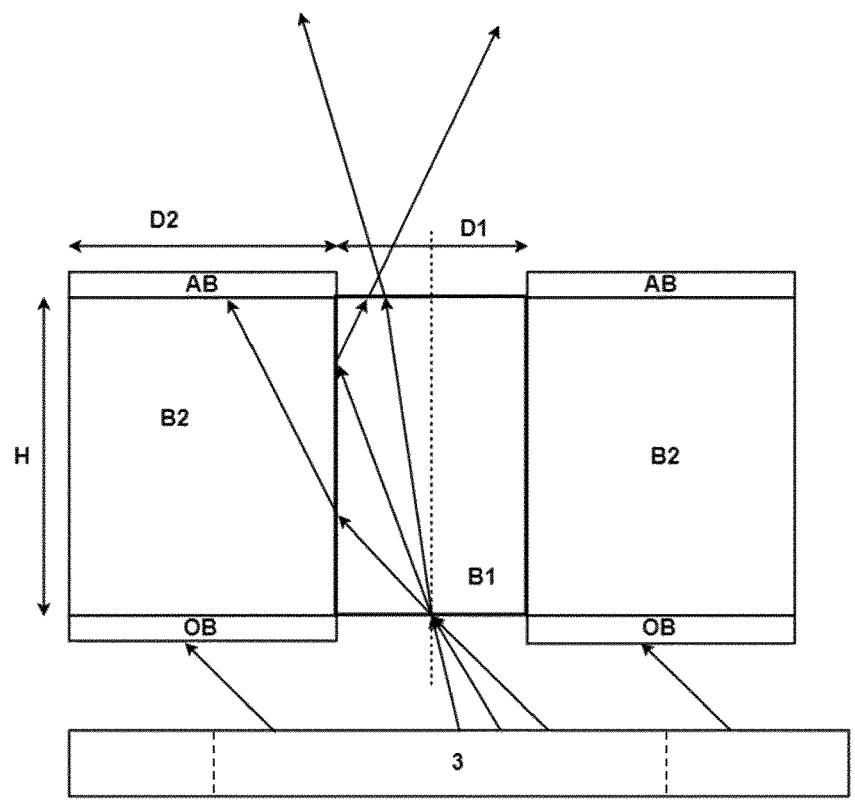
FIG. 21 the schematic diagram (sectional view) of a first optical element in a first embodiment in a first state, used with a self-luminous display unit.

Further, FIG. 21 shows the schematic diagram (sectional view, detail) of a first embodiment of a first optical element 1 in a first state, specifically, with the use of a self-luminous display unit 3. In this instance, the optical element 1 is arranged in viewing direction upstream of such a display unit 3, for example, an OLED panel, (although an LCD panel with backlight as well as any other display technology would be equally applicable) in order to selectively or permanently limit the light propagation directions thereof. In this case, optics can be provided on the display unit 3 which substantially concentrate the light emitted by the respective pixels of the display unit 3 on the surfaces opposite the first regions B1. This is possible, for example, with microlens arrays or lenticular elements which have approximately the periods of the pixel widths (or possibly pixel heights). In the best case, the periods of the first regions B1 (i.e., the sum of widths D2+D1) should then correspond to and be aligned with the periods of the pixel widths (or possibly pixel heights). A period of the pixel width of the display unit 3 is indicated by the two dashed lines in FIG. 21. A pixel then lies approximately in the middle opposite a first region B1, for example. Optics, described above, having microlens arrays or lenticular elements are not shown in FIG. 21 for the sake of clarity but may be provided.

Figure 25D:
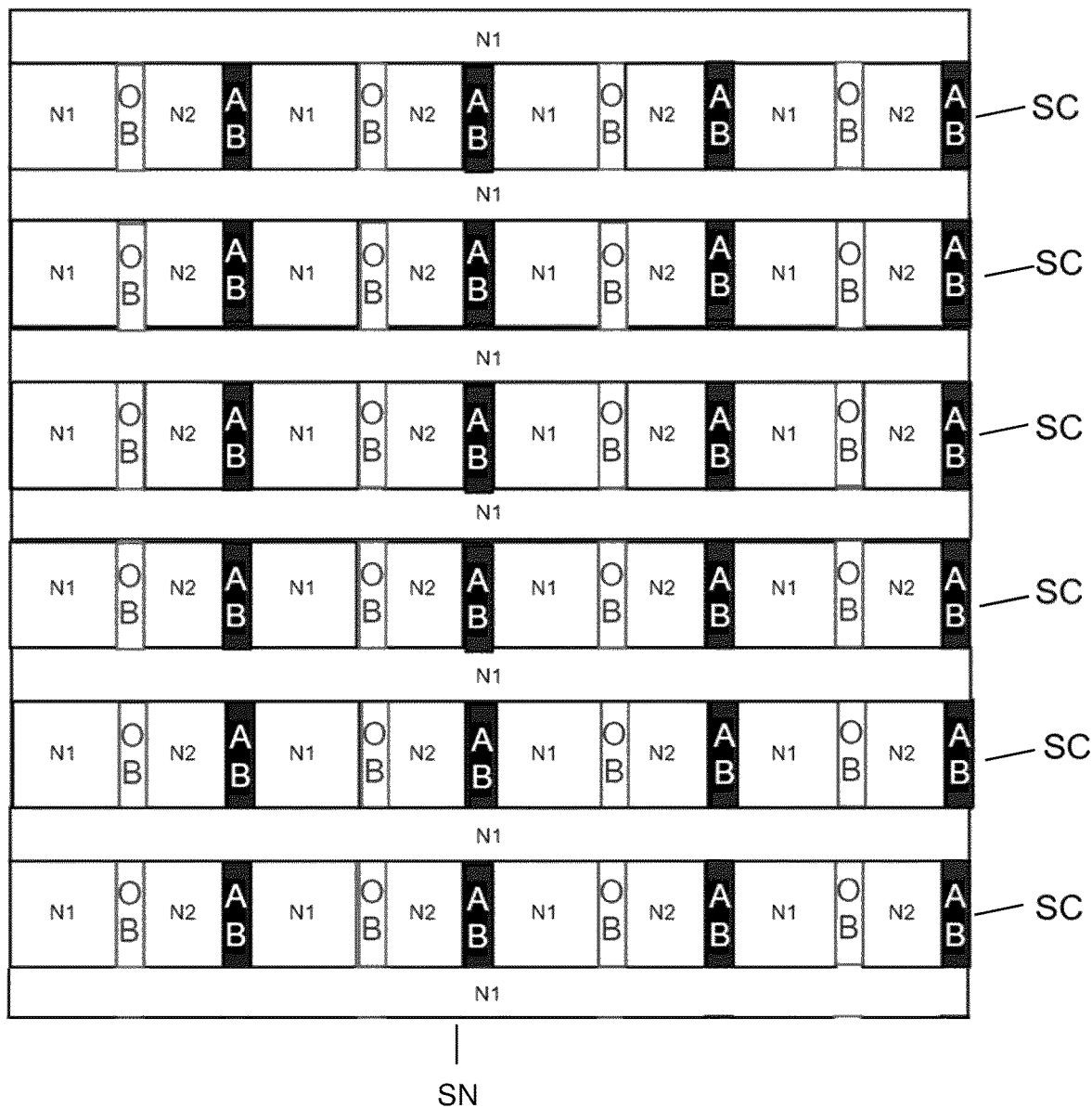
Figure 25E:
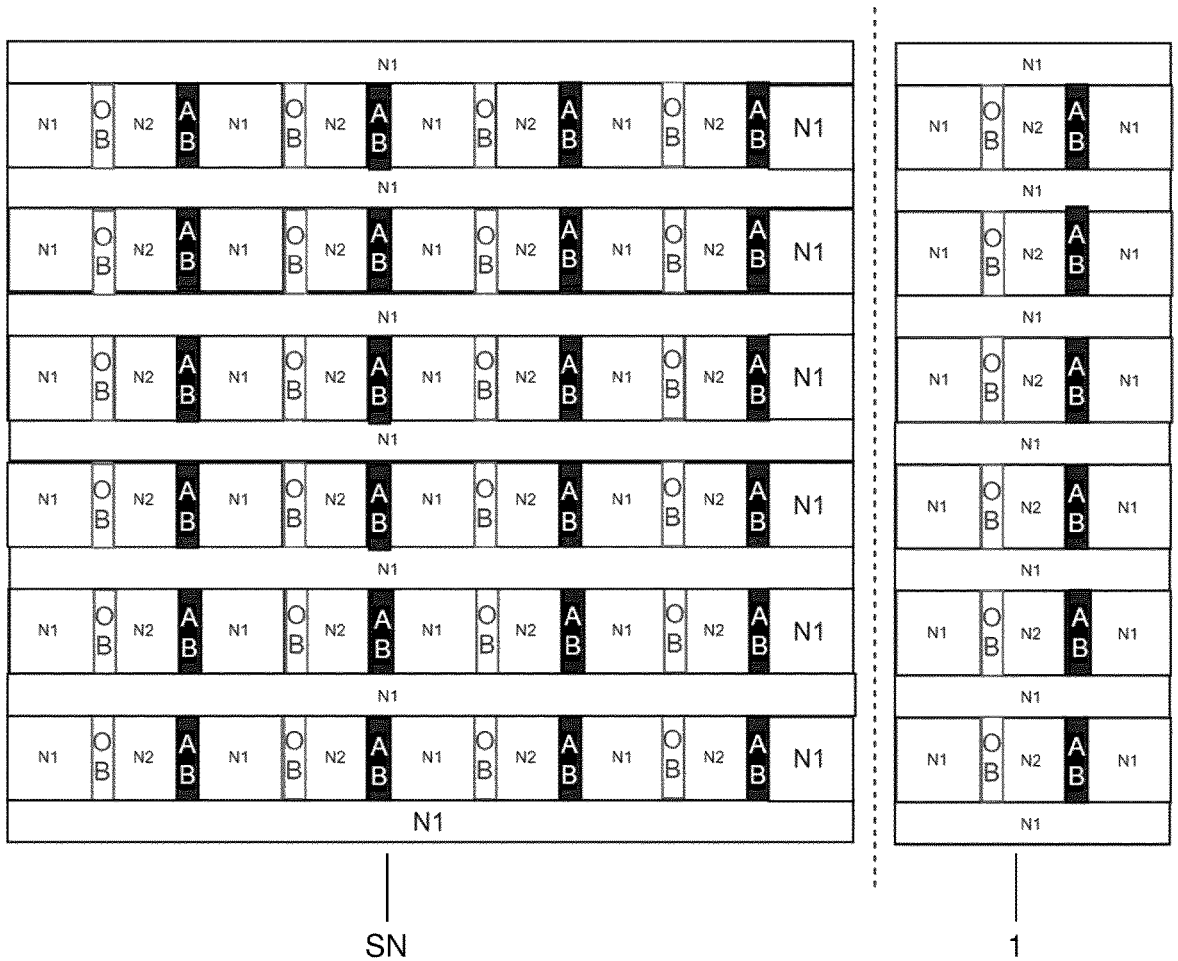
Figure 25F:
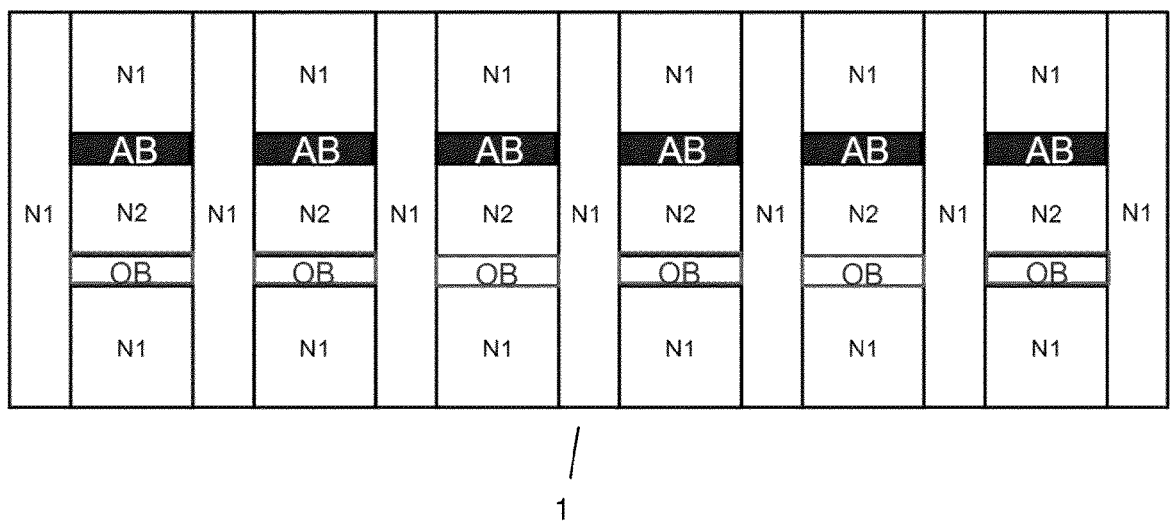

The invention further comprises another method for producing a first optical element 1 which will be explained referring to the drawings in FIGS. 25a to 25f showing simplified schematic diagrams. This method includes the following steps. First, a plurality of base blocks BL are generated which contain layers connected to one another in the following sequence: a second layer AB acting as absorber layer, a second transparent layer comprising a material with a second refractive index N2, an opaque first layer OB which is optionally reflective at the same time, and a first transparent layer comprising a material with a first refractive index N1 (see FIG. 25a). A plurality of base blocks BL are than stacked one above the other and connected, for example, by vulcanizing or cementing, in order to obtain a first stack block ST (see FIG. 25b). Disks SC with layer thickness D2 are then cut from the stack block ST, preferably perpendicular to the surface extension plane of the individual second layers AB (see FIG. 25c). Alternatively, a cutting angle of approximately 60° to 120° can be contemplated instead of the perpendicular cut. The disks SC are then stacked with first transparent layers having the first refractive index N1 and first layer thickness D1 interposed, in each instance, between the disks SC and are connected, for example, by vulcanizing or cementing, in order to obtain a second stack block SN (see FIG. 25d). Finally, optical elements 1 are cut from the second stack block SN, preferably perpendicular to the surface extension plane of the individual disks SC (see FIG. 25f). This results in (first) optical elements 1 as is shown in FIG. 25f. Of course, other production methods for an optical element 1 are also possible.

Figure 15:
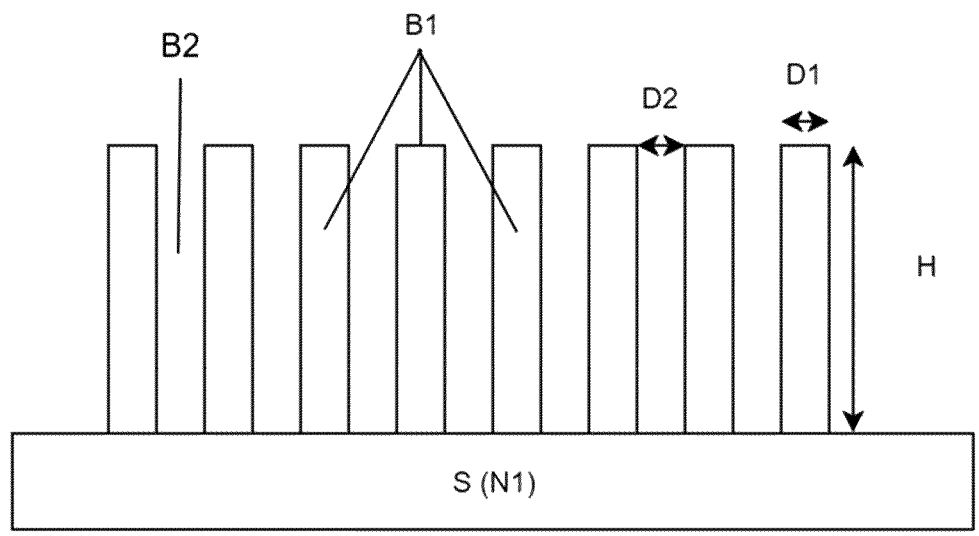
FIG. 15 the schematic diagram (sectional view) of a second optical element in a first embodiment.
Figure 16:
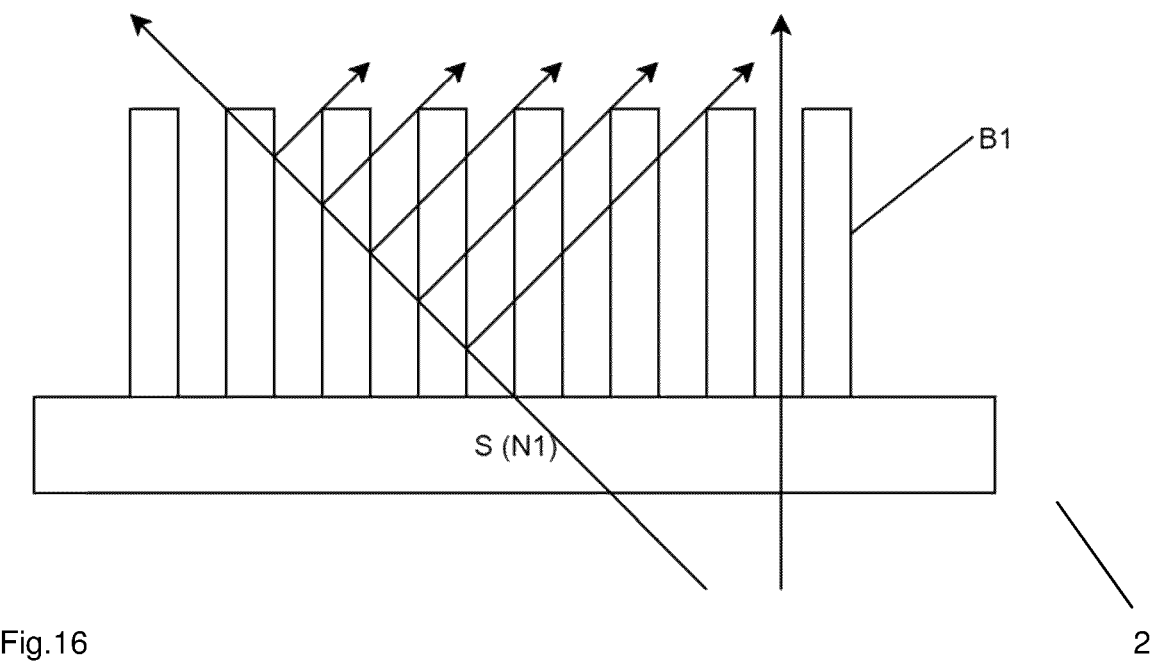
FIG. 16 the schematic diagram (sectional view) of a second optical element in a first embodiment showing exemplary rays.
Figure 26:
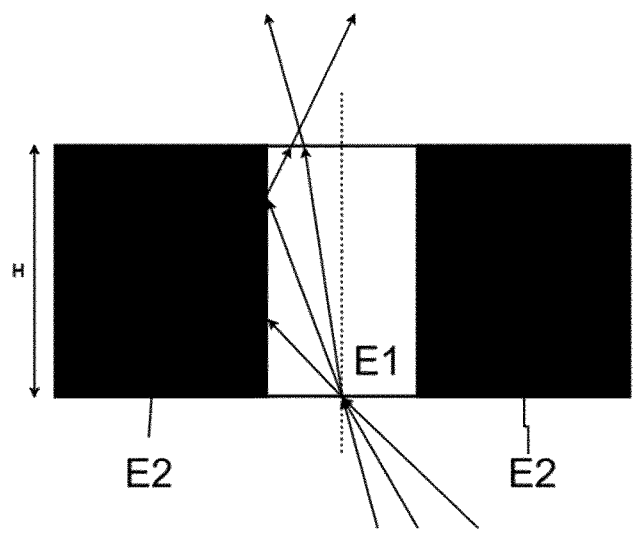
FIG. 26 the schematic diagram of a third optical element.

FIG. 15 shows a second optical element 2 which is formed of a one-dimensional or two-dimensional periodic sequence of two transparent complementary shapes with first regions B1 and second regions B2 with first refractive index N1 and second refractive index N2, respectively. The shapes are optionally formed on a planar substrate S and accordingly form a plane in two directions in each instance. The second refractive index B2 can advantageously be equal to one, i.e., the material in the shapes of the second regions B2 is air, for example. This is shown in FIG. 15 as a schematic diagram of a first embodiment of a second optical element 2. FIG. 16 shows exemplary ray paths. Accordingly, light which impinges on such a second optical element 2 in a (narrow-angled) preferential direction is transmitted unimpeded (see the ray on the right-hand side which is incident perpendicularly, i.e., in preferential direction), while light which has an angle of more than 15° relative to the aforementioned preferential direction (see the oblique light ray on the left-hand side) is deflected through the second optical element 2 because of total internal reflection and/or Fresnel reflections. The propagation directions of the emergent light are also influenced in this case. The preceding embodiments can be applied in an analogous manner and will therefore not be described again here. The configuration variants and means-effect relationships indicated above apply analogously in this instance and will not be repeated so as to avoid redundancy. Lastly, the invention comprises a third, two-dimensionally extensive optical element 10 having a light entry side and a light exit side which is shown schematically in FIG. 26 (detail in cross section). This optical element 10 comprises at least first regions E1 comprising a transparent material with a first refractive index N1 and second regions E2 comprising an opaque material with a second refractive index N2 which alternate over the surface of the optical element 10 in a one-dimensional or two-dimensional periodic sequence, the first refractive index N1 being higher than the second refractive index N2 within the entire wavelength range visible to the human eye. Because of the opaque material of the second regions E2, light impinging on the optical element 10 is incident in the optical element 10 at a first large-area surface of the optical element 10 exclusively through light entry surfaces of the first regions E1. Depending on the geometric direction of incidence, polarization and the ratio of the first refractive index N1 to the second refractive index N2, the light a) propagates unimpeded or is totally internally reflected inside of a first region E1. In every instance, the light is thereafter coupled out again at a light exit surface of the corresponding first region E1. Alternatively, b), the light penetrates from the first region E1 into an adjoining second region E2 and is absorbed because of the opaque material of the second regions E2.

Because of the different first refractive indices N1 and second refractive indices N2, rays penetrating into second regions E2 are refracted more strongly away from the perpendicular. Because of this, the light exiting from the optical element 10 at a second large-area surface thereof is limited with respect to its propagation directions relative to the light impinging on the optical element 10 at the first large-area surface. The opaque material with the second refractive index has a transparent component with which the second refractive index is associated and an opaque component comprising absorbent particles. The particles are preferably uniformly distributed in the opaque material and the mass percentage of opaque material is generally no more than 50%.

This third optical element 10 improves the prior art particularly in that, first, a top hat distribution can also be achieved with third optical elements which are similar to the louver filters, since, as a result of the total internal reflection, more useful light is transmitted in the desired limited angular ranges than—as is common in the prior art—without total internal reflection, and in that, second, the limiting of the angular ranges of the light penetrating the third optical element 10 is appreciably stronger because not only do the opaque louvers ensure the limiting of the light direction, but also the difference in refractive indices between regions E1 and E2 ensures that rays which penetrate into regions E2 are refracted more strongly away from the perpendicular and, therefore, would have to travel a longer optical path through the absorbent material, i.e., are accordingly—because of the longer path—more thoroughly absorbed than would be the case without such a difference in refractive indices.

As can be gathered by analogy from the explanations referring to FIGS. 8 to 10, slight differences in the refractive index of 0.01 are already sufficient for achieving excellent angular limiting. Such slight differences in refractive index can be achieved, for example, by doping a polymer or by using transparent silicone as material for regions E1 or E2 of a third optical element 10. In the simplest case, all of the regions E1 and E2 of a third optical element 10 would then comprise the same material. In addition, regions E1 would be doped for an increase in refractive index with transparent particles, and regions E2 would be doped for opacity, e.g., with opaque nanoparticles or microparticles.

This third optical element 10 can advantageously have a reflective coating at one of the large-area surfaces, preferably at the first large-area surface. This reflective coating is configured as an angle-dependent reflective coating of the entire large-area surface or as a fully reflective coating at the surfaces of regions E2.

A third optical element 10, described above, can advantageously be integrated in an illumination device for a transmissive display unit such as an LCD panel. This illumination device can then act permanently as directed backlight and can be used, for example, in configurations according to the applicant's WO 2015/121398 or WO 2019/002496.

FIGS. 27a-c and FIG. 28 show various further developments of such a third optical element which, in this case, is connected in each instance to a substrate M5 which, however, is not part of the optical element. As before, the third optical element 10 in this embodiment also has regions E1 comprising a first transparent material M1 with a first refractive index N1 and second regions E2 comprising a second opaque material M2 with a second refractive index N2. The second opaque material M2 is mixed with absorbent materials so that light is absorbed in the second regions in every case even if the original material is transparent. The second refractive index N2 is to be associated with the transparent component. In addition to the first regions and second regions, third regions comprising a further opaque material M3 with a third refractive index N3 are formed between every two second regions as is shown in particular in FIG. 27c. The third refractive index N3 is higher than the first refractive index N1 and higher than the second refractive index N2. The further opaque material M3 likewise has a transparent component which determines the third refractive index N3 and a component of absorbent particles which provides for the opacity. The mass percentage of absorbent particles in the second opaque material M2 and in the further opaque material M3 may amount to up to 50% or even more in particular cases. When using the further opaque material M3, the mass percentage of absorbent particles in the second opaque material M2 can also be appreciably less than 50%. The particles are shown schematically in the third regions M3 in FIG. 28, for example.

Figure 27A:
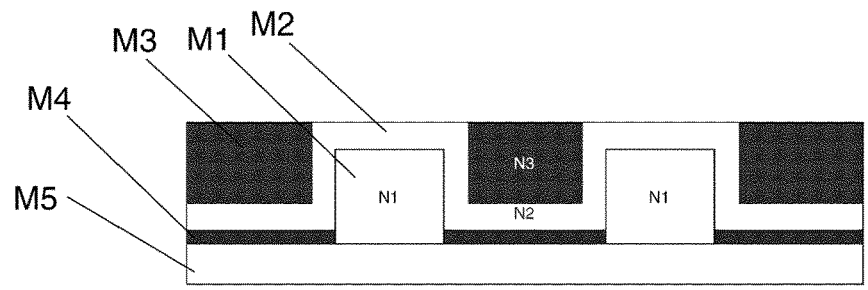
FIGS. 27a-27c various embodiments of the third optical element in a further development.
Figure 27B:
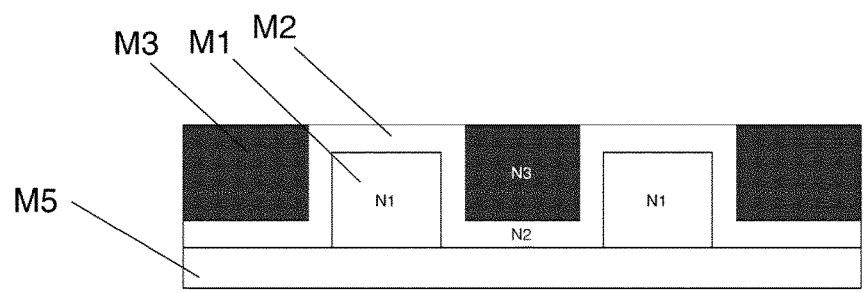
Figure 27C:
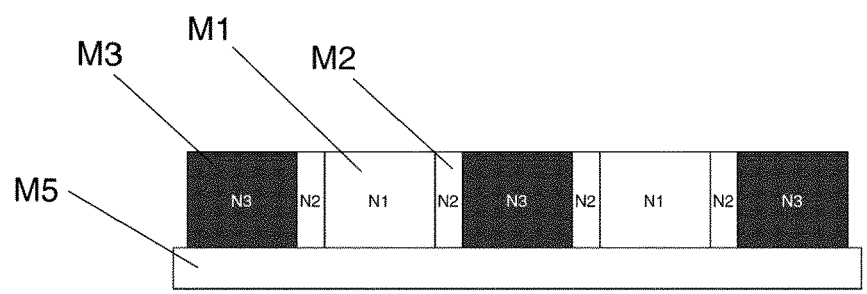
Figure 28:
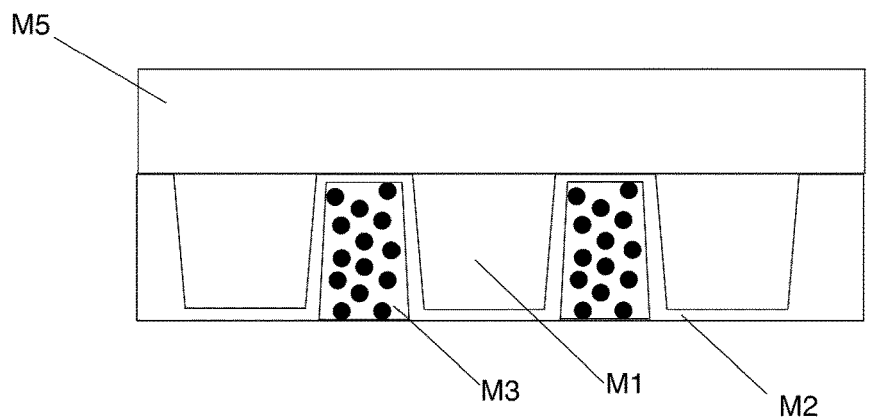
FIG. 28 a further embodiment of the third optical element.

As is shown in FIGS. 27a and 27b, second regions E2 comprising the second opaque material M2 with the second refractive index N2 can also be formed between the light entry side of the optical element 10 and the third regions comprising the further opaque material M3 on the one hand and between the light exit side of the optical element 10 and the light exit surfaces of the first regions E1 comprising the first transparent material M1 on the other hand. This is simpler to produce because it is then constitutes a closed layer of the further opaque material with a continuous surface. The first regions and second regions comprising the first transparent material M1 and the second opaque material M2 can also be formed in a trapezoid-shaped manner in cross section as is shown in FIG. 28. The trapezoidal shape of the first regions E1, which is also usable in the variants without a further opaque material, has the advantage that the angular distribution is focused better in this way and thus further improves the private viewing mode when the third optical element 10 is used in a corresponding display device. Referring to FIG. 27a, a reflective layer M4 is additionally applied at the light entry surface of the optical element 10 between the substrate and those second regions that are arranged between the substrate and the third regions comprising the third material M3. In this configuration, the second regions can be elongated, particularly as film, i.e., substantially thinner than the first regions and third regions, particularly at the light exit surfaces of the first regions.

The refractive indices N1, N2 and N3 are configured in such a way that a total internal reflection takes place between the first material M1 with the first refractive index N1 and the second material M2 with the second refractive index N2 for particular, small angles, i.e., the second refractive index N2 is lower than the first refractive index N1. The amount of the difference in refractive indices between the first refractive index N1 and the second refractive index N2 is preferably less than 0.1. The third refractive index N3 of the further, third material M3 which—like the second material M2—is mixed with absorbent materials is greater than or equal to, but not less than, the first refractive index and second refractive index. As a result, light rays which are not totally internally reflected at the interface between first material M1 and third material M3 are refracted at larger angles at the interface between the third material and second material.

Figure 29:
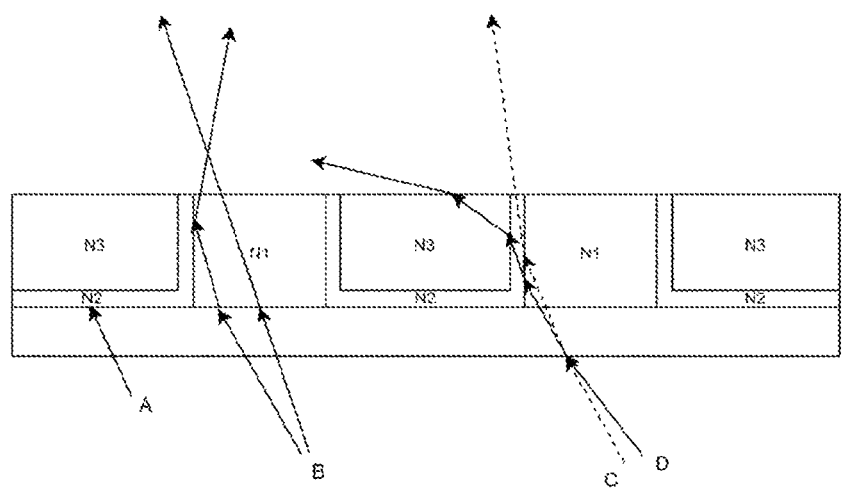
FIG. 29 the ray path for various incidence conditions.
Figure 30:
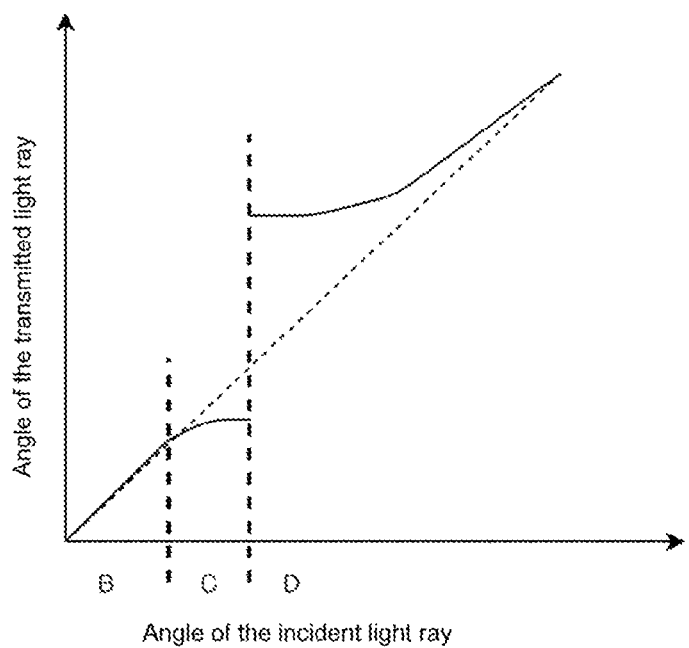
FIG. 30 angular ranges of the transmitted light compared to the incident light.

This is depicted for various cases in FIG. 29 and FIG. 30. In case A, light rays are reflected back by the reflective layer and then recycled in a backlight unit, not shown. In case B, for light rays with small angles of incidence, these light rays are either totally internally reflected at the interfaces between the first regions and second regions or pass unimpeded through the optical element 10 through the first regions. This corresponds in FIG. 30 to the region between the origin and the first dashed line on the abscissa. Incident angles and emergent angles are identical in amount.

Two cases must be distinguished depending on the incident angle for light rays which enter the first regions at angles larger than the angles of total internal reflection at the interface between the first region and second region. In case C—shown in dashes only to distinguish it from the path of rays in case D—the rays are refracted at the interface between first regions and second regions at smaller angles and exit the optical element at a light exit surface of a second region. This is only a rather small angular range depending on the thickness of the second region. In case D, rays initially enter from the first region into the second region and then the third region with even larger incident angles and are refracted at larger angles when impinging on the interface between the second region and third region. Ideally, an angular range results in which there is appreciably less light, if any, than is the case when there are no third regions, as a result of which the private mode is further improved.

Some of the variations described above for the first optical element 1 can also be applied to the second optical element 2 and the third optical element 10.

The above-stated object is met by the optical elements described above. Optical elements have been described which influence the propagation directions of incident light in a defined manner and which can optionally be switched between at least two operating states. Each optical element can be realized economically and, in particular, is universally usable with a variety of display screen types in order to make it possible to switch between a private mode and a public viewing mode with substantially no reduction, or only a negligible reduction, in the resolution of such a display screen. Further, the optical elements offer the possibility of achieving a top hat light distribution.

The advantages of the invention are multifaceted. The modes of operation mentioned above can be produced with an individual optical element which need not necessarily have surface structures. Further, the first regions B1 and second regions B2 of the optical element can be embedded in protective material, e.g., in the material of the first regions B1. Beyond this, the highly preferred top hat distribution is achieved in the emergent light, and any desired degree of privacy contrast is achieved in the theoretical simulation. In case an optical element according to the invention is applied in a backlight for an LCD panel, a high luminous efficacy is achieved. Moreover, it is possible to limit the light propagation in two planes, e.g., left/right and top/bottom simultaneously, with only one optical element.

The invention described above can advantageously be used in combination with a display device anywhere that confidential data are displayed and/or entered, such as when entering a PIN number or displaying data in automatic teller machines or payment terminals or for entering passwords or when reading emails on mobile devices. The invention can also be applied in passenger cars, such as when certain image contents intended for the passenger such as entertainment programs are to be selectively withheld from the driver. Further, the optical element according to the invention can be used for other technical and commercial purposes, such as for light alignment of darkfield illumination for microscopes and, broadly, for light shaping for illumination systems, such as for headlights and in measurement technology.

The invention claimed is:

1. A two-dimensionally extensive optical element having a light entry side and a light exit side, comprising:
   first regions comprising a first transparent material with a first refractive index and second regions comprising a second transparent material with a second refractive index which alternate over a surface of the first optical element in a one-dimensional or two-dimensional periodic sequence, wherein the first refractive index is higher than the second refractive index within an entire wavelength range visible to the human eye, in each instance, a first layer at a light entry surface of each of the second regions, which first layer is permanently opaque or is switchable between a transparent state and an opaque state, in each instance, a second layer at a light exit surface of each of the second regions, which second layer is permanently opaque or is switchable between a transparent state and an opaque state, wherein either every first layer or every second layer, or every first layer and every second layer, is permanently opaque, such that, owing to the first layers, light impinging on the optical element on the light entry side is incident in the optical element exclusively through the light entry surfaces of the first regions when the first layers are in an opaque state and, depending on the incident angle, polarization and the ratio of the first refractive index to the second refractive index:

a) is propagated unimpeded or is totally internally reflected inside of a first region and is thereafter coupled out again at a light exit surface of the corresponding first region, or b) penetrates from the first region into an adjoining second region, propagates in the latter and is ultimately absorbed at the light exit side thereof when the second layer is in the opaque state or is coupled out when the second layer is in the transparent state, or c) when the light has penetrated from the first region into the adjoining second region, penetrates in turn into a further, adjacent, first region and, depending on the propagation direction and polarization which then exist, is coupled out at the light exit surface or propagated further in the optical element until it is either coupled out or absorbed, as a result of which, the propagation directions of the light exiting from the optical element at the light exit side are limited compared to the light impinging on the optical element at the light entry side insofar as at least the first layer and/or the second layer is opaque, wherein every first layer is formed at the light entry surfaces of the second regions by a permanent absorber layer and/or by at least one layer reflecting away from the optical element, and/or every second layer is formed at the light exit surface of the second regions by a permanent absorber layer.

2. The optical element according to claim 1, wherein the first refractive index of the material in the first regions and/or the second refractive index of the material in the second regions are/is switchable between at least two states such that a ratio of the first and second refractive indices at boundaries between the first regions and the second regions can be modulated in each instance, as a result of which the limiting of the propagation directions is variable.

3. The optical element according to claim 2, wherein at least one of material of the first regions and/or second regions comprises liquid crystals which are in contact with electrodes in order to bring about a change in the refractive index for linearly polarized light in the liquid crystals via a change in a voltage at the electrodes.

4. The optical element according to claim 1, wherein the second layers and/or the first layers are switchable between an opaque state and a transparent state, wherein this switchability is based on one or more of the following principles: electrowetting, electrophoresis, electrochromism and/or liquid crystal cells.

5. The optical element according to claim 1, wherein the second layers and/or the first layers are embedded in material from which the first regions are composed, wherein a material component of the first regions of the optical element transitions seamlessly into the component in which the second layers and/or the first layers are embedded.

6. A method for producing an optical element according to claim 1, comprising the following steps:

producing a mold having a positive structure of the first regions and the negative structure of a carrier substrate, filling the mold with a first polymer which has a first refractive index after setting, curing the first polymer by UV light or by cooling to produce a workpiece, and subsequently removing the workpiece from the mold, filling structures of second regions in the workpiece with a second polymer which has a second refractive index after setting, curing the second polymer by UV light or by cooling.

7. A method according to claim 6, wherein, after the first polymer or second polymer is set, a material which is opaque or switchable between transparent and opaque is vapor-deposited or sputtered onto the second regions on the surfaces of the workpiece through a mask protecting the first regions.

8. A method for producing an optical element according to claim 1, comprising the following steps:

generating a plurality of base blocks which contain layers connected to one another in a sequence as follows: a second layer acting as absorber layer, a second transparent layer comprising a material with the second refractive index, an opaque first layer, and a first transparent layer comprising a material with the first refractive index, stacking a plurality of base blocks one above the other and connecting them in order to obtain a first stack block, cutting disks with a second layer thickness from the stack block, stacking disks with first transparent layers having the first refractive index and a first layer thickness which are interposed between the disks and connecting them in order to obtain a second stack block, and cutting optical elements from the second stack block.

9. The optical element according to claim 1, wherein first regions and the second regions viewed in parallel projection perpendicular to the optical element are arranged so as to be distributed in alternating stripes over the surface of the optical element.

10. The optical element according to claim 1, wherein the first regions viewed in parallel projection perpendicular to the optical element are arranged so as to be distributed over the surface of the optical element in a point-shaped, circular, oval-shaped, rectangular or hexagonal manner, and the second regions are shaped in a complementary manner.

11. The optical element according to claim 1, wherein a lens structure, preferably a convex lens structure, is applied to at least some of the first regions, on the light exit side thereof.

12. The optical element according to claim 1, wherein a polarizer, is arranged on the light entry side and/or the light exit side of the optical element.

13. The optical element according to claim 1, wherein there is formed on the optical element at least one first region, the shortest dimension of which when viewed in parallel projection perpendicular to the optical element is at least twenty times larger than a shortest dimension of all of the second regions when viewed in parallel projection perpendicular to the optical element, so that there is no limiting of the propagation directions of the light exiting from the optical element at the light exit side relative to light impinging on the optical element on the light entry side inside of the at least one first region, excluding at edges thereof and with the exception of parallel shifts.

14. The optical element according to claim 1, wherein, in addition to the first regions and second regions, further regions are formed with different parameters with respect to shape and/or refractive index than those of the first regions and second regions, so that light which penetrates these further regions and exits from the optical element undergoes limitations of the propagation directions that differ from those in the first regions.

15. A method of selectively limiting a viewing direction of a display unit, comprising:
   providing an optical element according to claim 1
   providing a display unit or a backlight for a transmissive display unit;
   causing the optical element to selectively limit a viewing direction of the display unit.

16. A two-dimensionally extensive optical element having a light entry side and a light exit side, comprising:
   first regions comprising a transparent material with a first refractive index and second regions comprising a permanently opaque material with a second refractive index which alternate over a surface of the optical element in a one-dimensional or two-dimensional periodic sequence, wherein the first refractive index is higher than the second refractive index within the entire wavelength range visible to the human eye,
   wherein the first regions and the second regions viewed in a sectional direction perpendicular to an upper surface of the optical element are trapezoid-shaped, and at least the first regions have, in each instance, a cross section of a trapezoid, wherein a longer bottom side of the trapezoid corresponds to a light exit surface of a corresponding first region,
   so that, owing to the opaque material of the second regions, light impinging on the optical element is incident in the optical element at a first large-area surface thereof exclusively through light entry surfaces of the first regions and, depending on a geometric direction of incidence, polarization and a ratio of the first refractive index to the second refractive index:
a) propagates unimpeded or is totally internally reflected inside of a first region and is thereafter coupled out again at a light exit surface of the corresponding first region, or
b) penetrates from the first region into an adjoining second region, where it is absorbed because of the opaque material of the second regions,
   wherein, owing to the different first refractive indices and second refractive indices, rays penetrating into an adjoining second region are refracted more strongly away from a direction that is perpendicular to a surface of the adjoining second region, the surface of the adjoining second region being in contact with a surface of the first region,
   as a result of which the light exiting from the optical element at a second large-area surface of the optical element is limited with respect to its propagation directions compared to light impinging on the optical element at the first large-area surface of the optical element.

17. The optical element according to claim 16, wherein the opaque material comprises a transparent material with the second refractive index which is mixed with an absorbent material, as a result of which an opaque effect is brought about overall.

18. The optical element according to claim 16 wherein the opaque material comprises a paint or polymer which is mixed with graphite particles having a size of less than 500 nm, with nanoparticles of carbon black having a size of less than 200 nm, or with dyes or mixtures of dyes as absorbent particles.

19. The optical element according to claim 16 wherein the optical element has a reflective coating on one of the two large-area surfaces, which is configured either as an angle-dependent reflective coating of the entire large-area surface or as a fully reflective coating on the surfaces of the second regions.

20. The optical element according to claim 16, wherein third regions comprising a further opaque material with a third refractive index are formed between every two second regions, wherein the third refractive index is higher than the first refractive index and higher than the second refractive index.

21. The optical element according to claim 20, wherein second regions are likewise formed between the light entry side of the optical element and the third regions and between the light exit side of the optical element and the light exit surfaces of the first regions.

22. A method for producing an optical element according to claim 16, comprising the following steps:
   stacking, in an alternating manner, first layers with a first refractive index comprising a transparent material and second layers with a second refractive index comprising an opaque material, wherein the first refractive index is higher than the second refractive index,
   connecting the first layers and second layers to one another,
   cutting optical elements from the layer composite of stacked and connected first and second layers.

* * * * *

UNITED STATES PATENT AND TRADEMARK OFFICE
CERTIFICATE OF CORRECTION

| | |
|---|---|
| PATENT NO. | : 12,066,699 B2 |
| APPLICATION NO. | : 18/245494 |
| DATED | : August 20, 2024 |
| INVENTOR(S) | : Andreas Bregulla, André Heber and Markus Klippstein |

Page 1 of 1

It is certified that error appears in the above-identified patent and that said Letters Patent is hereby corrected as shown below:

In the Specification

In Column 11, Line 53, delete "orb)" and insert -- or b) --, therefor.

In the Claims

In Column 32, Claim 18, Line 18, delete "16" and insert -- 16, --, therefor.

In Column 32, Claim 19, Line 24, delete "16" and insert -- 16, --, therefor.

Signed and Sealed this
Twenty-fourth Day of December, 2024

Derrick Brent
*Acting Director of the United States Patent and Trademark Office*